(12) United States Patent
Kiernan et al.

(10) Patent No.: US 11,070,579 B1
(45) Date of Patent: Jul. 20, 2021

(54) INTERACTIVE DISPLAY OF A CONFIDENCE-BASED GRAPH OF INTERNET RELATED ASSETS

(71) Applicant: RiskIQ, Inc., San Francisco, CA (US)

(72) Inventors: Chris Kiernan, San Francisco, CA (US); Elias Manousos, San Francisco, CA (US); Brandon Dixon, San Francisco, CA (US); Andrew Kant, Brookfield, WI (US); Jonas Edgeworth, San Francisco, CA (US); Sunder Srinivasan, Brooklyn, NY (US); Brian Zak, Denver, CO (US); Adam Hunt, El Cerrito, CA (US); Beckie Neumann, Oakland, CA (US); Jonathan Matkowsky, Mercer Island, WA (US)

(73) Assignee: RiskIQ, Inc., San Francisco, CA (US)

( * ) Notice: Subject to any disclaimer, the term of this patent is extended or adjusted under 35 U.S.C. 154(b) by 186 days.

(21) Appl. No.: 15/893,533

(22) Filed: Feb. 9, 2018

Related U.S. Application Data

(60) Provisional application No. 62/457,777, filed on Feb. 10, 2017, provisional application No. 62/460,688, filed on Feb. 17, 2017.

(51) Int. Cl.
*H04L 29/06* (2006.01)
*G06F 3/0484* (2013.01)

(52) U.S. Cl.
CPC .......... *H04L 63/1433* (2013.01); *H04L 63/20* (2013.01); *G06F 3/04842* (2013.01)

(58) Field of Classification Search
CPC . H04L 63/1433; H04L 63/20; H04L 63/1425; H04L 63/123; H04L 29/06; H04L 29/08; G06F 3/04842; G06F 3/048; G06F 8/34
USPC .......................................................... 726/25
See application file for complete search history.

(56) References Cited

U.S. PATENT DOCUMENTS

| | | | | |
|---|---|---|---|---|
| 10,326,786 | B2* | 6/2019 | Gladstone | G06F 21/554 |
| 2010/0275263 | A1* | 10/2010 | Bennett | G06F 21/577 |
| | | | | 726/25 |
| 2015/0379303 | A1* | 12/2015 | LaFever | G06F 21/6254 |
| | | | | 726/28 |
| 2017/0048266 | A1* | 2/2017 | Hovor | H04L 63/14 |
| 2017/0249642 | A1* | 8/2017 | Burpulis | G06Q 30/018 |

* cited by examiner

*Primary Examiner* — Quazi Farooqui
(74) *Attorney, Agent, or Firm* — Wong & Rees LLP; Kirk D. Wong

(57) ABSTRACT

An inventory of Internet-facing assets related to a target domain is generated using network data gathered from network data sources. Using data sources of known threats, such as malware, phishing attempts, scam pages, blacklisted sites, and so on, a network analytic system generates analytical information about domains, sub-domains, and components that are owned, managed, and/or controlled by a target entity. A confidence score of ownership is generated based on a recursive rule engine. A visual representation of the inventory of Internet-facing assets is generated in a graphical user interface.

31 Claims, 38 Drawing Sheets

INTERACTIVE DISPLAY OF A CONFIDENCE-BASED GRAPH OF INTERNET RELATED ASSETS

PRIORITY CLAIM

This application claims benefit under 35 U.S.C. 119(e) of U.S. Provisional Application No. 62/457,777, filed Feb. 10, 2017 entitled "TECHNIQUES FOR PROVIDING AN INTERACTIVE DISPLAY OF A CONFIDENCE-BASED GRAPH OF INTERNET-RELATED ASSETS," and of U.S. Provisional Application No. 62/460,688, filed Feb. 17, 2017 entitled "TECHNIQUES FOR PROVIDING AN INTERACTIVE DISPLAY OF A CONFIDENCE-BASED GRAPH OF INTERNET-RELATED ASSETS," the entire contents of the foregoing are incorporated herein by reference for all purposes.

TECHNICAL FIELD

The present invention relates generally to cloud-computing infrastructure, and in particular, to an interactive display of a confidence-based graph of internet assets.

BACKGROUND

As the use of the Internet and the amount of information available on the Internet has expanded, the ability to track and monitor information available over the Internet related to a particular subject or associated with a particular entity has been negatively impacted. The vast amount of information present on the Internet makes monitoring websites nearly impossible as it is difficult to quickly and efficiently compare the large amount of information contained within the large number of websites that may be associated with an entity. These challenges extend to the enterprise environment, in which an enterprise is faced with the burden of monitoring thousands of web documents accessed throughout an enterprise network including enterprise websites. In an enterprise system having thousands of electronic documents (e.g., documents provided via a website), compliance and security of the enterprise network and the enterprise websites become difficult to manage.

As the Internet grows in popularity, reliability, and speed, businesses may expose more and more computer assets to the Internet. For example, a business may expose a mail server to the Internet to provide e-mail services for employees, a content server to serve content (e.g., media files) to customers, a web server to serve web pages to customers, an ad server to serve ads to customers, etc. As more and more assets are exposed to the Internet, a business may find tracking which assets are exposed to the Internet difficult. As the number of assets exposed to the Internet continues to grow, it may become difficult to identify Internet assets of a particular business.

The relative ease of attacking, defacing, and impersonating Internet-related assets has placed an enormous burden on enterprises to stay on top of their Internet-facing assets. Every day, thousands of websites are compromised opening a backdoor to sensitive customer, employee, and company data—and damaging the trust between brands and their customers and prospects. Whether the motive is personal or political or financial gain, any business with Internet-facing assets can be victimized. It has never been more important to secure an organization's websites and apps than it is today.

Expanding attack surfaces and the rise of global adversaries leave companies increasingly vulnerable—and security teams blind—to threats that can exploit customers, users, and networks via Internet-facing assets such as web and mobile applications. Though companies are devoting more resources to securing digital assets, the speed at which those digital assets are standing up makes them easy prey for bad actors looking to take advantage. Companies usually counter cyber threats using several different tools, including firewalls, endpoint devices, and service-based solutions. But these approaches may not provide a complete view of an organization's attack surface. Because certificates expire, software requires patching, and assets associated with partner infrastructure can be compromised, blind spots can leave an organization at serious risk.

Organizations have attempted to discover Internet-facing assets to accurately identify, monitor, and manage their entire Internet attack surface. A more complete understanding of the scale of the organization's Internet presence—and continuous visibility into the attack surfaces—may be necessary for an organization to make more accurate, comprehensive, and strategic risk-management decisions. A Chief Information Security Officer (CISO) tasked with understanding an organization's presence may wish to understand the global scope of the organization's Internet-exposed attack surface. The CISO may want to know whether penetration tests and audits are covering everything that they should be covering, whether any subsidiary organization or acquisitions are putting the organization at risk based on their Internet-exposed attack surface, and whether there are any risks inherent in the global supply chain based on such Internet-exposed attack surfaces. A CISO may seek to find a way to communicate the security status of the global Internet presence to the board, customers, and partners.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIGS. 6-16, and 18-38 illustrate example graphical user interfaces of the asset discovery platform;

DESCRIPTION OF EXAMPLE EMBODIMENTS

Figure 1:
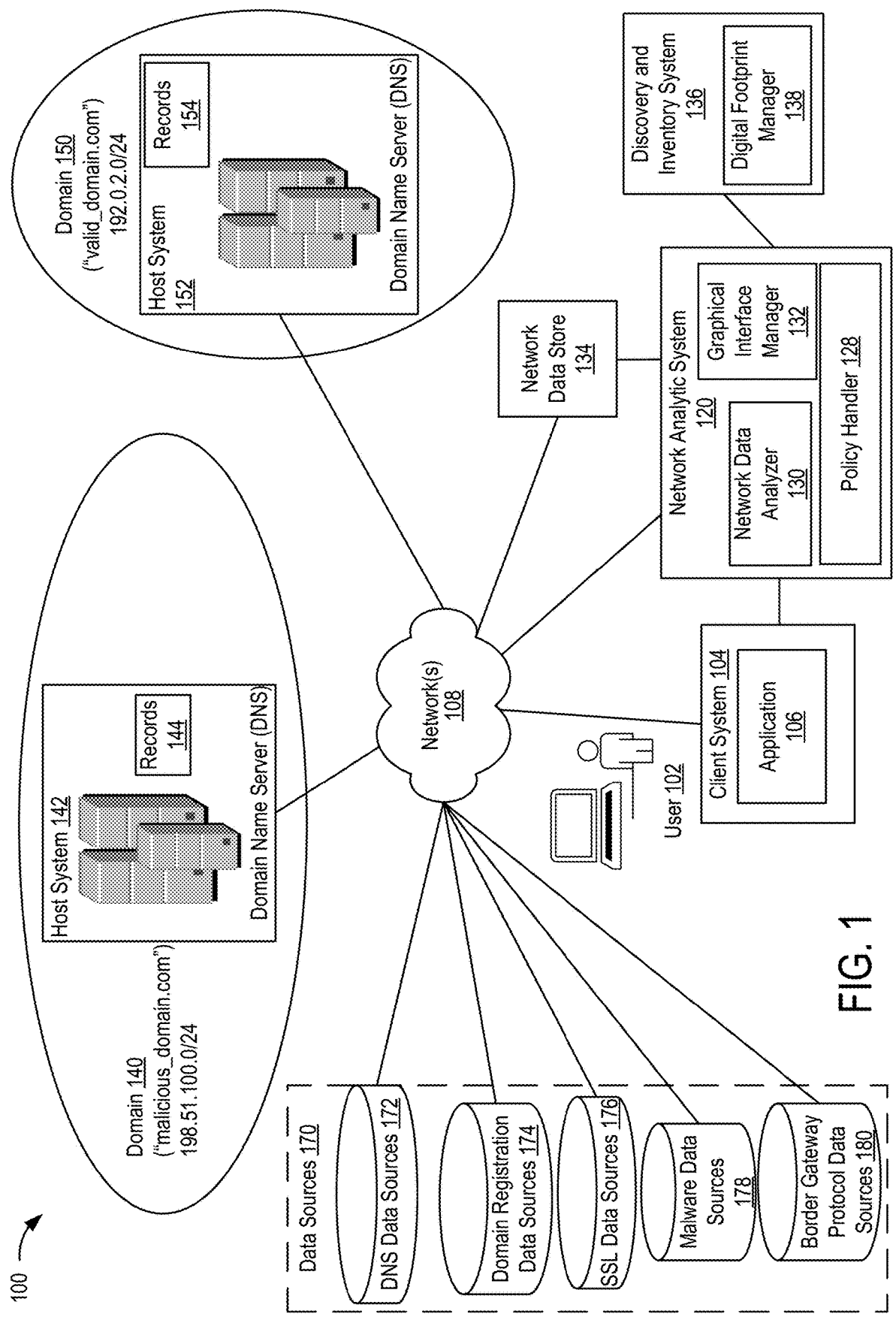
FIG. 1 illustrates an example overall asset discovery platform.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1.0. General Overview
2.0. Functional Overview
3.0. Example Embodiments
4.0 Implementation Mechanism—Hardware Overview
5.0. Extensions and Alternatives 1.0 GENERAL OVERVIEW This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follow below.

An asset discovery platform 100 may include one or more client systems 104 (referred to herein as "client system" or "client") and network analytic system 120. Network analytic system 120 may be implemented by a computing system. Client system 104 may be operated by one or more users (e.g., user 102), such as a network analyst whose role it is to assess network activity.

Client system 104 may include an interface, such as a physical interface, a graphical interface (e.g., a graphical user interface), or a combination thereof. A graphical interface or physical interface may be generated by client system 104, received from network analytic system 120, or a combination thereof. The graphical interface may be updated or modified by client system 104 or network analytic system 120 in response to interaction with the interface. Examples of graphical interfaces are disclosed herein with reference to FIGS. 6-16 and 18-38, which enable functionality of network analytic system 120. The interface may be provided by network analytic system 120 via network 108 as part of a service (e.g., a cloud service) or application. In some embodiments, client system 104 may provide access to one or more applications 106 ("app"). App 106 may enable a user to access and perform services provided by network analytic system 120.

Client system 104 and network analytic system 120 may be communicatively connected via one or more communication networks 108. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Figure 29:
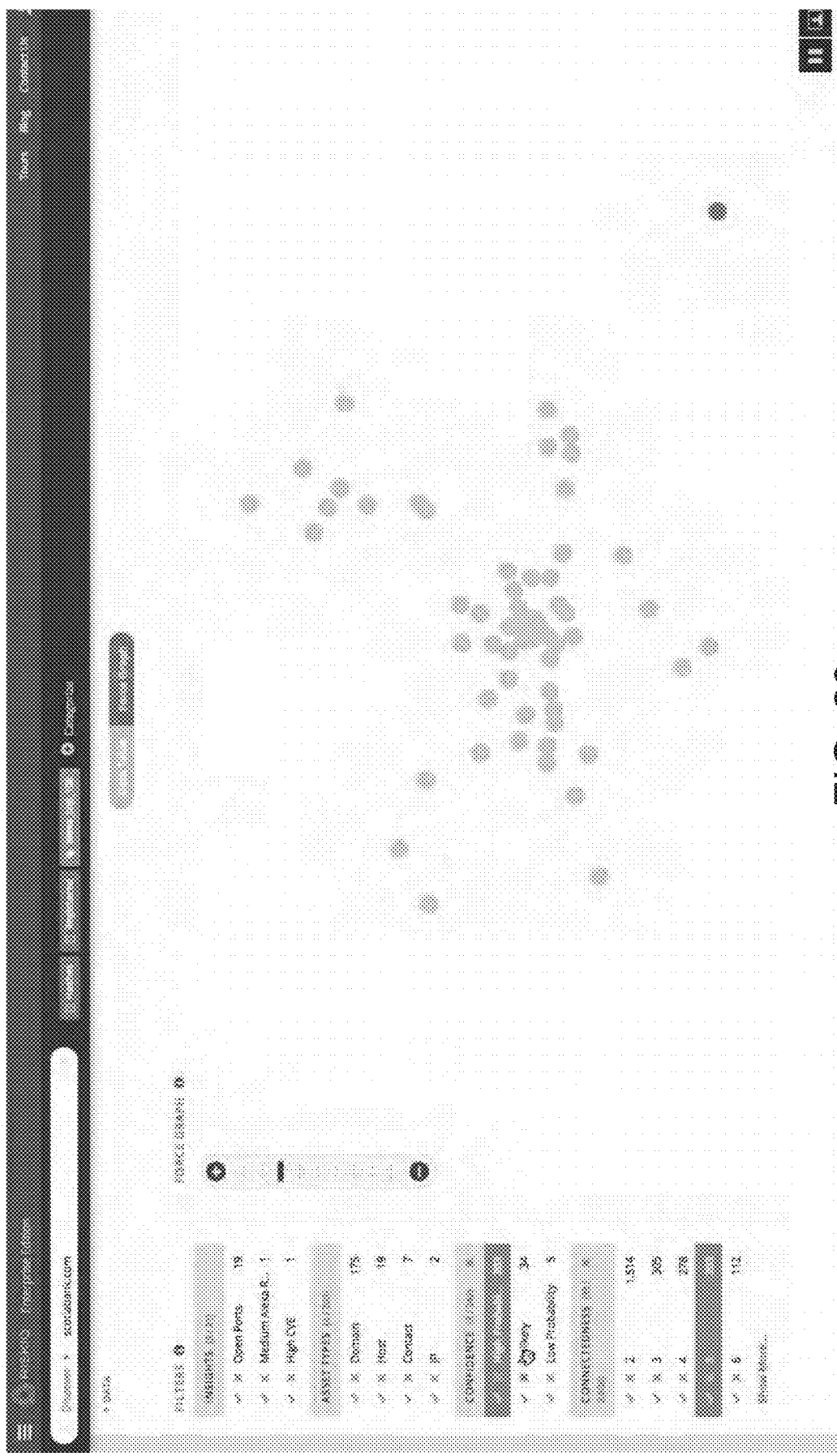

Network analytic system 120 and discovery and inventory system 136 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing systems that makes up network analytic system 120 and the discovery and inventory system 136 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, network analytic system 120 and discovery and inventory system 136 may be included in or implemented with a product provided by RISKIQ, INC. In some embodiments, network analytic system 120 may be implemented with or included in a discovery and inventory system 136 implemented using techniques described with reference to U.S. patent application Ser. No. 14/420,029 titled "System and Method of Identifying Internet-Facing Assets" filed on Oct. 21, 2014, which is incorporated by reference and included as part of this disclosure for all purposes. In various embodiments, network analytic system 120 and discovery and inventory system 136 may be configured to run one or more services or software applications described in the foregoing disclosure. As shown in FIG. 29, network analytic system 120 may be implemented with discovery and inventory system 136. Discovery and inventory system 136 may gather data on Internet-related assets using a crawl process described with reference to U.S. patent application Ser. No. 14/420,029 titled "System and Method of Identifying Internet-Facing Assets" filed on Oct. 21, 2014.

Discovery and inventory system 136 may include a digital footprint manager 138 that can perform processing to create, manage, layout, and persist one or more digital footprints of Internet assets. Specifically, techniques disclosed herein with respect to a digital map or footprint may be performed by digital footprint manager 138. Network analytic system 120 may correspond to a computing system for performing processing as disclosed herein according to an embodiment of the present disclosure.

In some embodiments, network analytic system 120 and discovery and inventory system 136 may be implemented as an enterprise computing system or a cloud computing system comprising one or more computers and/or servers that may include those described above. Network analytic system 120 and discovery and inventory system 136 may each include several subsystems and/or modules, including some, which may not be shown. For example, network analytic system 120 may include network data analyzer 130, policy handler 128, and graphical interface manager 132. Network data analyzer 130 and policy handler 128 may implement operations disclosed herein as being performed by network analytic system 120. Graphical interface manager 132 may implement operations disclosed as being performed for generating, displaying, and interacting with the interfaces disclosed herein. Discovery and inventory system 136 may include digital footprint manager 138. Network analytic system 120 and discovery and inventory system 136 may have more or fewer subsystems and/or modules than shown in the figure, may combine two or more subsystems and/or modules, or may have a different configuration or arrangement of subsystems and/or modules. Subsystems and modules of network analytic system 120 and discovery and inventory system 136 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, network analytic system 120 may also provide other services or software applications can include non-virtual and virtual environments. In some embodiments, these services may be offered as web-based or cloud services or under Software as a Service (SaaS) model to the users of client system 104. The services offered by network analytic system 120 may include application services. Application services may be provided by network analytic system 120 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in network analytic system 120, which may be implemented as a cloud infrastructure system. Users can acquire the application services without the need for customers to purchase separate licenses and support. Various different SaaS services may be provided. Users operating client system 104 may in turn utilize one or more applications to interact with network analytic system 120 to utilize the services provided by subsystems and/or modules of network analytic system 120.

Network analytic system 120 and discovery and inventory system 136 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes disclosed herein. The memory in network analytic system 120 and discovery and inventory system 136 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations disclosed herein.

An asset discovery platform 100 may also include or be coupled to one or more data sources 170, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, an asset discovery platform 100 may be coupled to or may include one or more data sources, such as DNS data sources 172, domain registration data sources 174 (e.g., a WHOIS registry), SSL data sources 176, malware data sources 178, and border gateway protocol (BGP) data sources 180. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data sources 170 may be accessible by network analytic system 120 using network 108. Network analytic system 120 can obtain terabytes of data from across the Internet to generate a digital footprint of Internet assets. Data may be obtained from DNS data sources, such as passive sensor data from across the Internet, current and historical WHOIS data, SSL certificate information, host pairs, and related web trackers. Additionally, data may be obtained from other sources, such as databases including social media content associated with an entity as well as databases including mobile application metadata associated with an entity. For example, an entity may have a social media presence that includes pages on social networking systems, social media accounts on messaging platforms, and the like. Schemas for encoded structured data specifying a social profile may be stored in databases, accessible by the platform 100 as a data source 170. Similarly, information about mobile applications listed on application stores and/or application exchanges may be stored as metadata in a database and accessed by the platform 100 as a data source 170. For example, a mobile app database can be searched for a developer email address associated with a domain name. Such information may be available in a listing on the application store or application exchange.

In some embodiments, discovery and inventory system 136 may generate one or more data sets about Internet assets. Network analytic system 120 may access discovery and inventory system 136 to obtain data sets from discovery. The data sets may be generated based on data obtained from one or more data sources 170 as part of a discovery process. The data sets may include additional data generated by digital footprint manager 138 for generating a digital map based on the discovery process. The techniques for discovery disclosed herein may be implemented by system 136 as part of a process that is independent of or included with a discovery process implemented by system 136. As described below, a user may interact with network analytic system to implement a discovery process, which is then performed all or in part by system 136. The discovery process may include generating a digital footprint, or map, the assets discovered as related to any of the assets of one or more entities. Digital footprint manager 138 may create, manage, layout, and store the digital footprint and one or more data sets generated for the digital footprint. Upon request, digital footprint manager 138 can provide a digital footprint to network analytic system 120. Digital footprint manager 138 can generate a digital footprint before or after a request for a footprint because, in one embodiment, the discovery and inventory system 136 may continuously generate, update, and manage digital footprints of all digital assets on the Internet. A digital footprint may be created based on network data from one or more data sources for network activity that has occurred in the past and/or recently in real-time. A digital footprint may be provided for a subset of assets with regard to a specific asset.

In some embodiments, policy handler 128 may be implemented to apply one or more rules of a policy for determining Internet assets that are related to an entity's Internet-facing assets based on one or more criteria. The rules may be based on ownership analysis of an entity to identify Internet-based assets to identify occurrences of each unique entity with respect to entity being analyzed. The policy may be applied using an algorithm, that recursively queries and/or crawls one or more data sources 170, such as a WhoIS data source, DNS data source, and BGP data source, to identify all Internet-facing assets. The assets may include assets of results previously generated. Policy handler 128 may interact with network data analyzer 130 to obtain data from one or more sources. In some embodiments, network data analyzer 130 may process data for applying one or more rules. Policy handler 128 may communicate with discovery and inventory system 136 to identify related assets based on a digital footprint of the assets in an inventory of an entity.

Policy handler 128 may recursively apply rules of a policy to Internet-facing assets, to determine a measure (e.g., a frequency) of a relationship with an entity with respect to assets in an inventory of the entity being assessed. The measure may be compared with the frequency of relationships that other assets of any entity have with the entity being assessed to determine whether one entity associated with any of the other assets appears more often within the inventory of an entity than outside of the inventory. The comparison may be performed to determine a measure, such as a score (e.g., a confidence score) that indicates whether an entity belongs in the inventory based on application of a scoring threshold. The threshold may be assessed based on a percentage calculation (e.g., <50%=low confidence, etc.) from the comparison. The relationship between assets may be determined based on a confidence score determined by applying one or more rules of a policy and assessing based on a threshold. The relationship may be provided to digital footprint manager 138 to generate a footprint that is based on the relationships identified. The relationship between assets may be compared on the basis of one or more network attributes, such as domain names, hosts, IP blocks, IP addresses, ASNs, name servers, and mail server contacts.

In some embodiments, discovering digital assets under common ownership, management or control of an entity includes determining whether an Internet asset is owned, managed or controlled by that entity. The measure of confidence may be assessed to determine whether it provides absolute confidence. A threshold for the measure may be defined based on absolute confidence (e.g., absolute confidence satisfied by >90%) that an entity is under management of the entity being assessed because the entity in question has an asset that is in the inventory. The threshold for absolute confidence may be based on the application of many different rules disclosed herein.

Regardless of whether an entity has an asset in the inventory with absolute confidence, a policy may be applied to determine information (e.g., one or more attributes) about relationships between assets of an entity and other assets that are not specifically within the inventory of the entity. Such information may indicate a measure of assets that are related to each asset in the inventory, a measure of confidence, a type of connection to an asset in the inventory, and a degree of connections to assets in the inventory. In some embodiments, the information may be compared to one or more thresholds that are configured to determine whether any asset is within an inventory and measure of confidence that the asset is in an inventory. For example, the threshold may be defined based on a ratio, which if higher than the threshold, may indicate whether the asset may be in the inventory. In some embodiments, a user can interact with the assets in an interactive display to further determine absolute confidence as to whether any particular asset is within an inventory of an entity.

An asset discovery platform 100 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, an asset discovery platform 100 may be coupled to or may include one or more data stores, such as network data store 134. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data. The data store 134 may be accessible by network analytic system 120 using network 108.

An asset discovery platform 100 may include one or more Internet assets that are accessible to an entity. An asset discovery platform 100 may include one or more Internet-facing assets, which may include assets of the entity. For example, an asset discovery platform 100 may include one or more network domains (e.g., an Internet domain), such as domain 140 and domain 150. Each domain may be implemented by a host system, which implements a domain name server (DNS) for the domain. The DNS may maintain a directory of domain names and translate, or resolve them to Internet Protocol (IP) addresses. Domain 140 may include a host computing system 142. Host computing system 142 may stores records 144 to Implement a DNS for domain NO. Domain 140 and domain 150 may be mapped (e.g., via DNS) to one or more W addresses. Domain 150 may include a host computing system 152. Host computing system 152 may store records 154 to implement a DNS for domain 150. Domain 140 may be communicatively connected to network 108 via an access network. Domain 150 may be communicatively connected to network 108 via an access network.

It should be noted that although not shown in FIG. 29, each of domain 140 and domain 150 may include one or more sub-domains. Each domain may also be a sub-domain of a larger domain. A domain may map to one or more IP addresses (e.g., via DNS), where each IP address is associated with a host (e.g., a host computing system). A host or host system as referred to herein may include one or more domains, and one or more IP addresses associated with each domain. As used herein, a host may include general purpose computers, as well as other devices, that have an IP address.

In some embodiments, network analytic system 120 can generate one or more data structures as part of analyzing network data. The data structures may be generated by network data analyzer 130, policy handler 128, or a combination thereof for comparing assets with respect to an inventory of an entity. Data may be generated to indicate information about relationships between assets and the assets themselves, such as type of connection and number of connections.

Network analytic system 120 can generate one or more graphical interfaces as disclosed herein. A graphical interface may display a visual structure, such as a graph (e.g., force graph) that shows the relationships between assets. The graph may be displayed with different appearances to indicate different relationships, different assets, and other information about related assets, or information related to a particular asset. The graphical interface may be interactive to indicate the relationships including measure of confidence with respect to a relationship between assets. Interaction with the graph may cause an operation to be performed. For example, selecting an asset may indicate information about the relationship of that asset to other assets inside and outside an inventory. The graphical interface may be interactive to change the way the information is displayed. In some embodiments, any of the graphical interfaces disclosed herein may be displayed with or implemented with the techniques disclosed in U.S. patent application Ser. No. 15/398,295 filed on Jan. 4, 2017 and entitled "TECHNIQUES FOR INFRASTRUCTURE ANALYSIS OF INTERNET-BASED ACTIVITY."

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 FUNCTIONAL OVERVIEW

Figure 2:
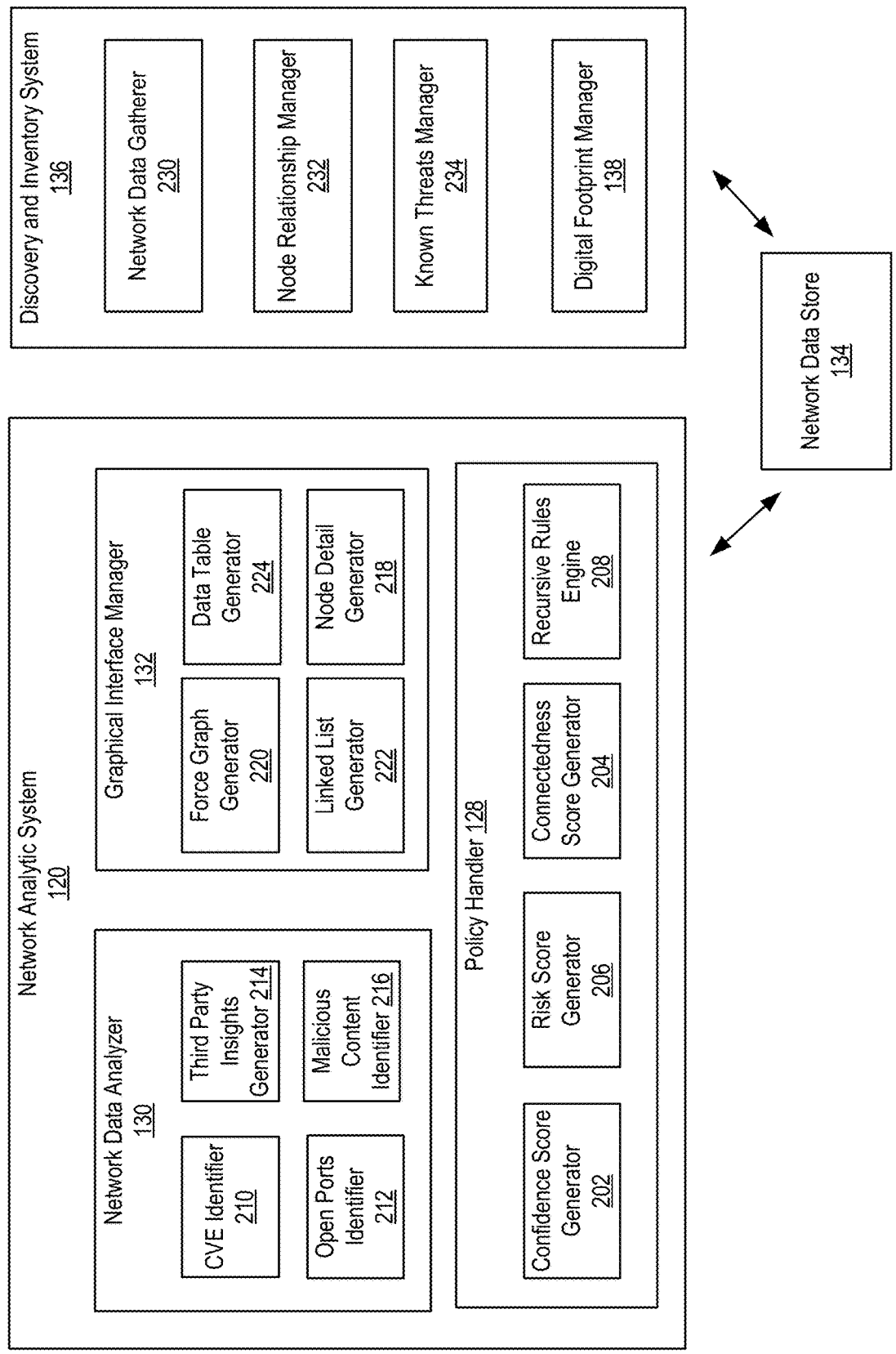
FIG. 2 illustrates an example high-level block diagram, including an example asset discovery platform.

FIG. 2 illustrates an example high-level block diagram, including an example network analytic system 120 and an example discovery and inventory system 136.

The network analytic system 120 may perform processes for providing an interactive interface of related Internet assets. Individual embodiments may be described as a process which can be depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes disclosed herein may be implemented in software (e.g., code, instructions, program) executed by one or more processing units (e.g., processors cores), hardware, or combinations thereof. The software may be stored in a memory (e.g., on a memory device, on a non-transitory computer-readable storage medium). For example, network analytic system 120 and/or discovery and inventory system 136 of FIGS. 1 and 2 can implement the processes disclosed herein. Any of the processes may be implemented as a service to a user of network analytic system 120.

The particular series of processing steps disclosed herein are not intended to be limiting. Other sequences of steps may also be performed according to alternative embodiments. For example, alternative embodiments of the present disclosure may perform the steps outlined above in a different order. Moreover, the individual steps may include multiple sub-steps that may be performed in various sequences as appropriate to the individual step. Furthermore, additional steps may be added or removed depending on the respective particular applications. One of ordinary skill in the art would recognize many variations, modifications, and alternatives.

In at least one embodiment, a process may begin by performing a process to determine an inventory of Internet assets. The Internet assets may be those accessible via the Internet, or a subset of assets accessible within a particular network environment. A discovery and inventory system 136 may include a network data gatherer 230, a node relationship manager 232, a known threats manager 234, and a digital footprint manager 138, for example.

Network data gatherer 230 may utilize various data sources, such as data sources 170 depicted in FIG. 1, including DNS Data Sources 172, Domain Registration Data Sources 174, SSL Data Sources 176, Malware Data Sources 178, and Border Gateway Protocol Data Sources 180. Information about Internet-facing assets may be captured in data records and stored in a network data store 134.

Based on the inventory of assets, a digital footprint of the assets may be generated. The digital footprint may be for all or a subset of assets. Data records may be generated for each Internet asset including information about the asset accessible from one or more data sources including a domain registration data source. For example, trackers, such as analytic codes, social network accounts and other unique details, are extracted directly from the web pages. These values may provide additional insights into additional infrastructure that typically goes unnoticed by static datasets. In an embodiment, the network data gatherer 232 may include one or more processes that coordinate sensors and web crawlers to gather information about assets on the Internet.

Additional information about the relationships between assets may be identified and stored with the record. A node relationship manager 232 may identify relationships between assets, such as host pair detection, captured information regarding components of technology used on the website, and other information gathered from various data sources. These records may be accessed to obtain a digital footprint for specific assets being assessed under a policy. In some embodiments, one or more data structures may be generated to detail and/or layout the digital footprint. The digital footprint may be stored for persistent and updated based on new and/or real-time data.

A digital footprint manager 138 may generate, update, and/or manage the digital footprint. For example, as more information is gathered about a domain, such as known threats from a listing of hashes identified to be malicious, domains known to be blacklisted, and other information and/or intelligence retrieved from data sources by the known threats manager 234, the digital footprint manager 138 may update affected data records in the network data store 134. In other embodiments, the digital footprint may be generated, updated, and/or managed according to a schedule.

A network analytic system 120 may include a network data analyzer 130, a graphical interface manager 132, and a policy handler 128. As illustrated in FIG. 2, a network data analyzer 130 may include a CVE identifier 210, an open ports identifier 212, a third party insights generator 214, and a malicious content identifier 216. The network data analyzer 130 uses gathered network data information and generates analytic information that is useful in identifying vulnerabilities, potential threats, and other security liabilities included in a digital footprint for a domain. For example, a CVE identifier 210 uses a listing of publicly known CVEs (Common Vulnerabilities and Exposures) to identify connected assets that may be known as "critical," "high," and/or "medium" CVEs. An open ports identifier 212 may identify open ports, or a TCP (Transmission Control Protocol) or UDP (User Datagram Protocol) port number that is configured to accept packets. Services, such as web pages or FTP (File Transfer Protocol), require their respective ports to be open on the server in order to be publicly reachable on the Internet. A third party insights generator 214 may use third party tools and/or data sources to derive insights about a domain. For example, a domain may be known for having a high Alexa rank, having a low Alexa rank, and having a medium Alexa rank. An Alexa rank is a traffic rank based on three months of aggregated historical traffic data from millions of Alexa Toolbar users and is a combined measure of page views and unique visitors. A malicious content identifier 216 may determine that a domain may be known to serve scams, have poor reputation hosts, serve phish, and/or be blacklisted.

A policy handler 128 may include a confidence score generator 202, a risk score generator 206, a connectedness score generator 204, and a recursive rules engine 208. A policy with one or more rules may be used for determining a relationship between assets for a digital footprint.

A confidence score generator 202 may include, in at least one embodiment, a rule for determining "relative confidence" that is implemented recursively to determine a measure (e.g., a frequency) of a relationship with an entity with respect to assets in an inventory of the entity being assessed. The measure may be compared with the frequency of relationships that other assets of any entity have with the entity being assessed to determine whether one entity associated with any of the other assets appears more often within the inventory of an entity than outside of the inventory. The comparison may be performed to determine a measure, such as a score (e.g., a relative confidence score) that indicates whether an entity belongs in the inventory based on a scoring threshold. The threshold may be assessed based on a percentage calculation (e.g., <50%=low confidence, etc.) from the comparison. The relationship between assets may be determined based on a relative confidence score determined by applying one or more rules of a policy and assessing using a threshold. The relationship may be provided to digital footprint manager 138 to generate a footprint that is based on the relationships identified. The relationship between assets may be compared on the basis of one or more network attributes, such as domain names, hosts, IP blocks, IP addresses, ASNs, name servers, and mail server contacts. Internet assets of an entity may be assessed to determine a measure of confidence as relative confidence based on applying a rule for measuring confidence.

In some embodiments, discovering digital assets under common ownership, management and control of an entity includes determining whether an Internet asset is owned, managed or controlled by that entity. The measure of confidence may be assessed to determine whether it provides absolute confidence. Absolute confidence may be determined based on applying one or more rules as discussed below. A threshold for the measure may be defined based on absolute confidence (e.g., absolute confidence satisfied by >90%) that an entity is under management of the entity being assessed because the entity in question has an asset that is in the inventory. The threshold for absolute confidence may be based on the application of many different rules disclosed herein. Recursion may be applied upon determining absolute confidence for a connected Internet asset. If absolute confidence is not determined, then a policy can be applied to calculate the number of digital assets that a particular asset is related to, based on what confidence level and types and degrees of connections, and by comparing that to the number of digital assets within the discovery of the inventory of the enterprise based on the absolute confidence scoring. If the ratio is higher than a threshold, the user can interact with the graph to decide to further apply the absolute confidence scoring and apply the rules again to the new subset of assets. In other words, the user can interact with the graph and filter by confidence score and/or degrees of connections, enabling the user to confirm or verify whether selected additional entities not already auto-confirmed or guaranteed to be part of the enterprise inventory should be so treated in order to then re-apply the rules to re-generate the force graph of the enterprise inventory.

Rules for absolute confidence may include 1) identifying any domain name that has the same Host is under common ownership, management or control (Domain-Host Rule); 2) identifying ay domain names registered to the contact for the enterprise or parent entity is under common ownership, management and control of the enterprise or parent entity (Domain-Contact Rule); 3) identifying the Contact email of the enterprise or parent entity owns all domains registered to it (Contact-Domain Rule); 4) identifying the ASN owns or controls the IP addresses within the IP space of that ASN (ASN-IP Rule); 5) identifying the IP Block contact owns or controls the IP block (IP block Rule); 6) identifying an IP block owner who controls the Hosts within that IP space; and/or 7) identifying the name servers control domain names (NS-Domain).

To elaborate on the Domain-Host Rule, every computer connected to the Internet has a unique identity. The machine is either referred to by its IP address or by its host name, which is basically the machine name and domain name Through DNS, host names are translated into equivalent IP addresses, and IP addresses into equivalent host names. The registrant organization on whose behalf the registrant registers the domain name controls which machines to put on a domain name and which IP addresses to point those machines to. Therefore, the owner of the domain name controls which hosts are used on the domain names they registered.

To elaborate on the Domain-Contact Rule, every domain name has a registrant contact organization if the domain name is registered to an organization. A person is assigned to be the registrant contact for that organization on whose behalf the domain is being registered. Any domain names specifically registered to a person as the contact point for an organization is under the organization's control because that organization delegates the management and control of the domain name to the representative, and can take it away at any time.

To elaborate on the Contact-Domain Rule, if a domain name is specifically registered to a contact point at the organization, then all domain names registered to that contact point at the organization are owned, managed, or controlled by that organization.

To elaborate on the ASN-IP Rule, an IP address is a numeric identifier that includes information about how to reach a network location through the Internet routing system. Every device directly connected to the Internet must have an IP address. Every IP address must be unique for devices to connect to the Internet and to each other. An Autonomous System (AS) is a group of IP networks that use a single and clearly defined routing policy. ASNs are globally unique numbers used to identify these groups of networks. ASNs allow an autonomous system to exchange routing information with neighboring autonomous systems. The ASN controls and manages the routing of the IP address space within that group of IP networks.

To elaborate on the IP Block Rule, address assignments are made in a hierarchical fashion. At the top of the hierarchy is ICANN, whose IANA function distributes large blocks of 16,777,216 addresses (known as/8's) to one of five regional Internet address registries (RIRs). The RIRs then accept applications from organizations with networks that need addresses within their territory. Some larger blocks may be assigned directly to end user organizations, but most will go to Internet service providers who will then re-assign them to their customers. An "allocation" is an address block given to an Internet service provider for intermediate use in selling internet service to other users. An address "assignment" is a block given to end users for their own use; e.g., corporations or universities with private networks.) The organization that is allocated the address block for intermediate use or that has the assignment of that block manages that IP space and has control over its use.

To elaborate on the NS Rule, passive DNS data allows researchers to track which domain names are hosted by particular name servers, and which domain names point to which IP networks. The name servers hosting the domain name has control over the domain name, so if an entity controls the name server, that entity controls the domain name.

Connectedness, or the number of connections to other assets, may be measured as well as a measure of confidence of connectedness to assets. A connectedness score generator 204 may generate a connectedness score by applying one or more rules and may be dependent on a confidence score. For example, a number of connections to other assets may be counted to be included in the connectedness score. Additionally, a measure of confidence of connectedness to assets may be determined separately by the risk score generator 206. The risk score may represent a measure of confidence that linked assets should be connected to the digital footprint, in an embodiment. In a further embodiment, a risk score may include a measure of risk of attack based on known vulnerabilities, threats, identified malicious content, and/or other analytics affecting nodes connected to the domain as illustrated by the digital footprint of the domain.

In some embodiments, based on determining connectedness and/or confidence, data records may be generated by the digital footprint manager 138 and/or discovery and inventory system 136 for each asset with regard to the footprint. In some embodiments, the digital footprint may be updated by the digital footprint manager 138 to include the data about connectedness and confidence.

A graphical interface manager 132 includes a force graph generator 220, a linked list generator 222, a data table generator 224, and a node detail generator 218. A force graph may be generated by the force graph generator 220 for one or more Internet assets in an inventory for an entity. A node detail generator 218 populates detail information of a node that is selected within the force graph. In one embodiment, a user can provide input of one or more sets of entity information, or keystones, for which a digital footprint is requested. A keystone may include at least one or a combination of a domain name, a domain registrant email account, name server, a Host, ASN, IP Block, IP Address, Mail server. The graph may be generated based on a keystone, or information identifying a subset of assets to analyze. A digital footprint may be accessed from the discovery and inventory system 136. The graph may be generated based on the digital footprint including the connectedness and confidence scoring information.

A graphical interface may be generated such as those disclosed herein. The graphical interface may display a graph. The graph can show details when a node is clicked, and builds a curated digital inventory for a given query. The contextual highlights based on an audit trail allows user to efficiently track back the various paths from an asset to the digital keystones of the organization. There is a finder navigation within the graphical interface to traverse the edges and nodes of the graph for certain Internet assets or entities, and the graph gives contextual highlighting to understand the connection types in relation to assets that have an automatically generated absolute confidence score.

Through the graphical user interface, a user may select one or more filters to narrow the displayed assets and re-apply the rules to re-generate the force graph of the selected inventory of assets based on the filters applied. The force graph has the value of displaying the relationships based on numbers and types of connections as well as confidence score, to make it easier for the analyst to interact with the inventory in relation to assets that may need to be analyzed to determine whether to include in the inventory, but also in terms of analyzing certain types of risks or vulnerabilities within certain subsets of the footprint as the user interacts with it to explore this threats or vulnerabilities, as well as to locate points of contact specifically associated with the identified vulnerabilities being explored for purposes of remediation. Furthermore, through an audit trail, the user can always understand how they explored the connections and degrees of confidence that led them to a particular asset under consideration or groups of assets in relation to the relevant vulnerabilities being explored or pursued.

A data table generator 224 enables a user to view detailed information about the assets in a tabular format. A linked list generator 222 enables a user to view linked assets of a particular node by column. A linked list may be presented in a graphical user interface provided by the graphical interface manager 132. A filterable list of all nodes may be presented in a first column. As a user selects a node from the first column, data associated with the selected node, including nodes that are directly and/or adjacently connected to the selected node, is populated in a second column. In this way, the user selects a node to pivot from. From the second column, a user may choose a presented node to pivot from and similarly populate a third column of nodes. Nodes may be faded or altered in appearance in the graphical user interface if they are circular connections to the previously selected nodes.

3.0 EXAMPLE EMBODIMENTS

Figure 3:
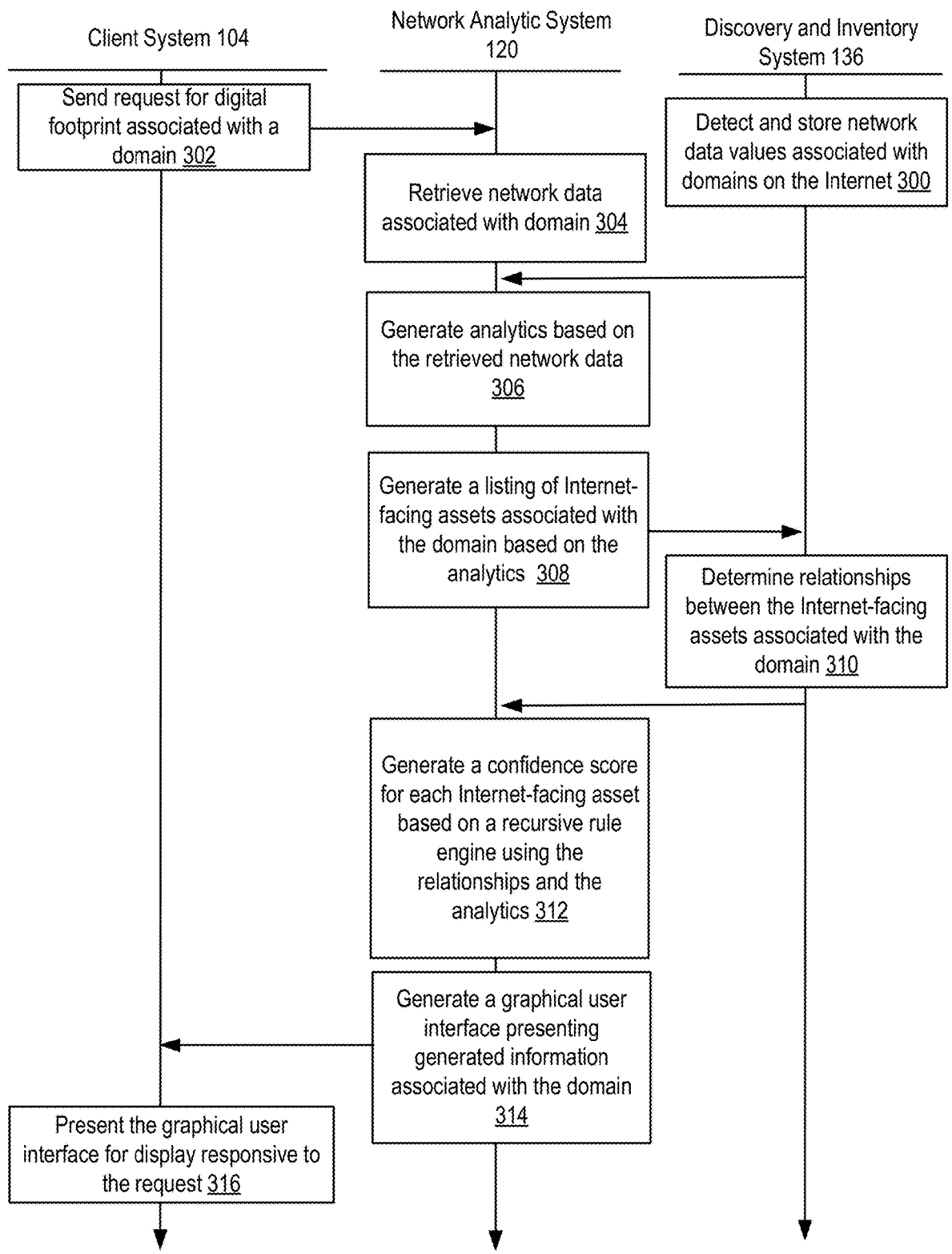
FIG. 3 illustrates an example high-level block diagram, illustrating an example interaction flow.

FIG. 3 illustrates an example high-level block diagram, illustrating an example interaction flow that may be implemented by a computing system (or device) as described herein. A discovery and inventory system 136 may detect and store 300 network data values associated with domains on the Internet. A client system 104 may send 302 a request for a digital footprint associated with a domain. For example, irs.gov is a domain that has an associated digital footprint. The request for the digital footprint may made through a user interface presented at the client system 104, in an embodiment. A network analytic system 120 may receive the request and may then retrieve 304 network data associated with the domain. In one embodiment, the network data may be a previously generated digital footprint associated with the domain included in the request.

Analytics are generated 306 based on the retrieved network data. For example, domains, subdomains, components included on the domains, and other assets may be analyzed by a network data analyzer 130 to generate various analytics and/or security attributes associated with the domain, such as identifying CVEs, open ports, malicious content such as blacklisted websites, hashes of known threats, webpages serving scams and/or phishing attempts, and traffic flow rankings. A listing of Internet-facing assets are generated 308 that are associated with the domain based on the analytics. Relationship between the Internet-facing assets are determined 310 by the discovery and inventory system 136. Based on a recursive rule engine using the relationships and the analytics, a confidence score is generated 312 for each Internet-facing asset by the network analytic system 120. As described above, the confidence score may translate to various labels describing whether the asset is "owned," meaning the asset is either owned, managed, or controlled by the entity, using user-adjustable threshold percentages, such as an absolute confidence (e.g., over 90%), a high probability, unlikely, low probability, and/or unknown.

A graphical user interface is generated 314 presenting generated information associated with the domain. This generated information includes nodes represented the owned assets, links between the nodes as illustrated in a force graph, as well as different colors and sizes of the nodes based on various information attributed to the asset. The client system presents 316 the graphical user interface for display responsive to the request. The graphical user interface may also include a filter interface that enables a user to select one or more filters based on attributes of the nodes to highlight nodes on the graph based on the selected filters. Additionally, different ways of presenting the generated information may be included in the graphical user interface, including a linked list interface that shows, in a column format, nodes and adjacent nodes in the force graph, in one embodiment. In another embodiment, a user may selectively alternate between a force graph interface and a linked list interface. In yet another embodiment, a user may select a path of nodes to traverse (or pivot) through a linked list interface and then may view a force graph illustration of the selected path through the force graph interface.

Figure 4:
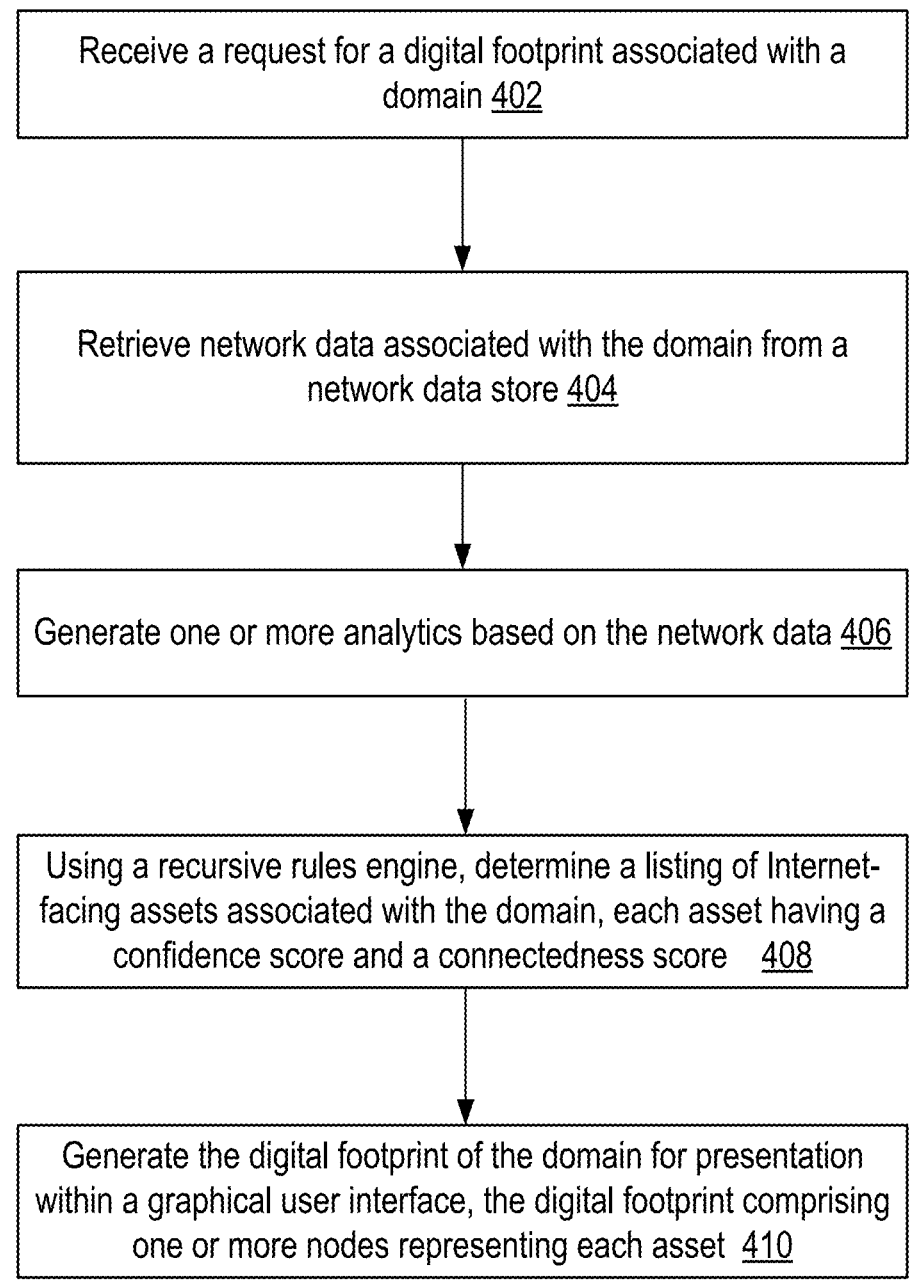
FIG. 4 illustrates an example process flow.

FIG. 4 illustrates another example process flow that may be implemented by a computing system (or device) as described herein. In block 402, a request for a digital footprint associated with a domain is received.

In block 404, network data associated with the domain is retrieved from a network data store.

In block 406, one or more analytics are generated based on the network data.

In block 408, using a recursive rules engine a listing of Internet-facing assets associated with the domain is determined, each asset having a confidence score and a connectedness score.

In block 410, the digital footprint of the domain is generated for presentation within a graphical user interface, the digital footprint comprising one or more nodes representing each asset.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

The graphical interfaces in FIGS. 6-16 and 18-37, disclosed herein provide some examples of displaying Internet-related assets according to some embodiments. In this disclosure, "an element" may be included in a graphical interface. An element may be displayable and/or part of a graphical interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface. For example, an interactive element can be one of many in a graphical interface such as a heat map for which network data is displayed.

Figure 6:
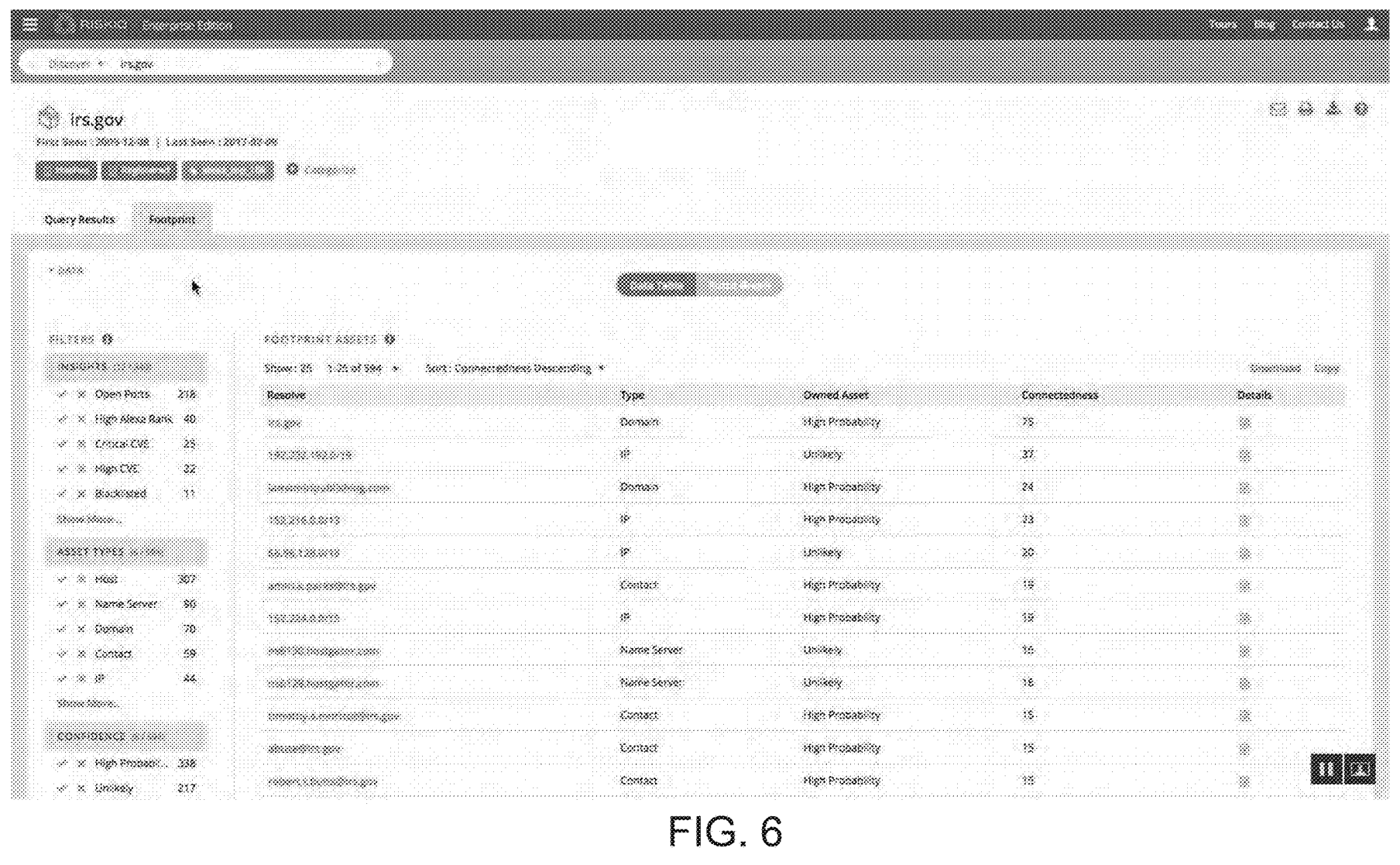
Figure 33:
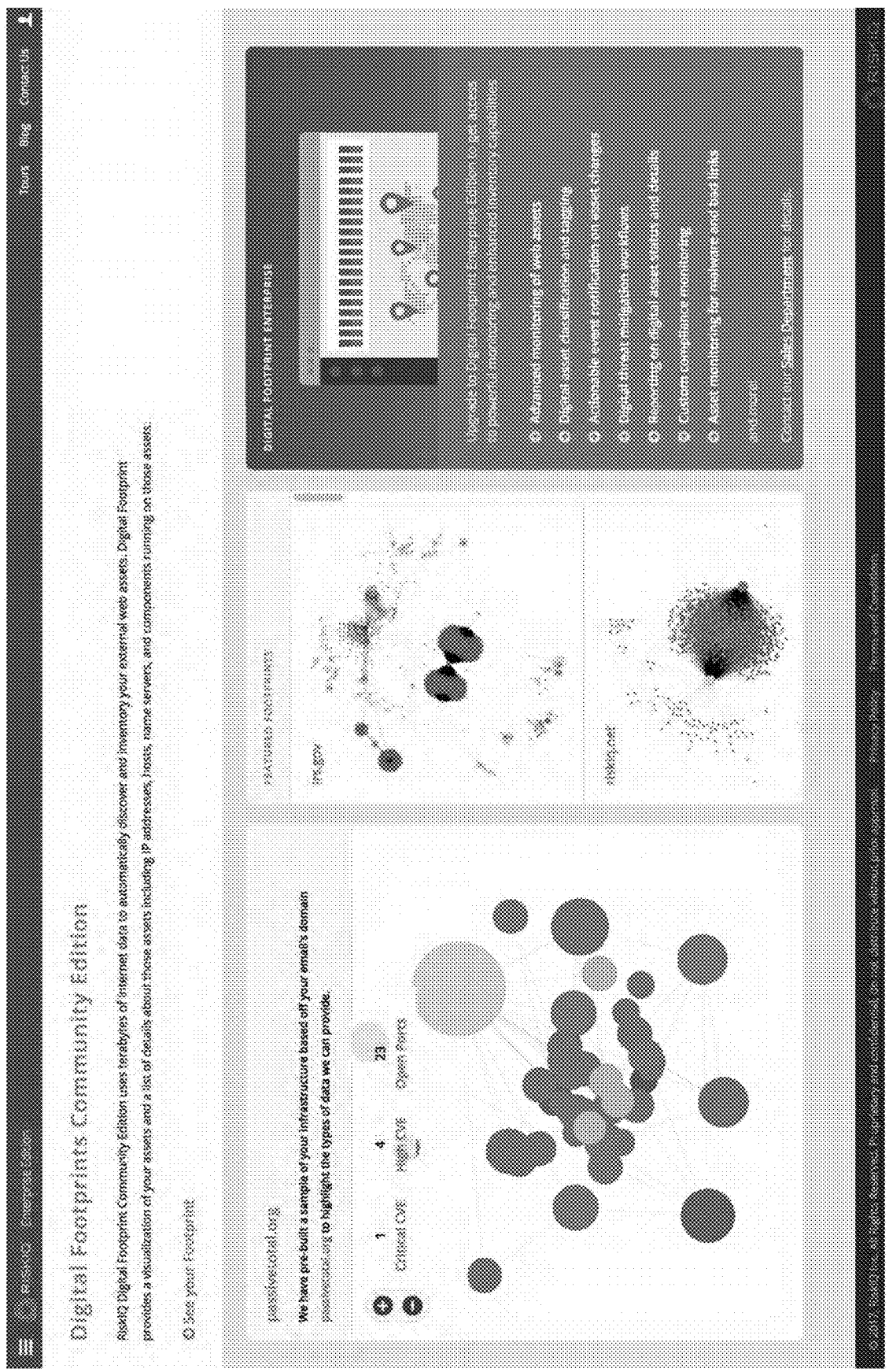

In FIG. 6, a graphical interface is displayed in which a user provide input, such as a keystone (e.g., irs.gov) to view assets related to the IRS. Network analytic system 120 may perform processing using data one or more data sources to determine each distinct Internet asset that may have a relationship to the attribute indicated by the keystone. The graphical interface ("Footprint") may display a table view ("Data Table") and a graph view ("Force Graph"). FIG. 33 illustrates a graphical interface of features of a graph view of showing a digital footprint of assets and details about those assets, such as IP address information, host information, name server information, and components related to those assets.

The table shown in FIG. 6 includes a record for each unique asset and information about that asset based on a category. The data for each record may be generated by network analytic system 120 and/or discovery and inventory system 136 as part of identifying relationships between assets. The categories may include a type of asset, a measure of relationship ("owned asset") to the entity associated with the keystone, connectedness, and details. The graphical interface may include one or more elements that are interactive to filter for each category with respect to each unique value occurring for all the identified assets. You can sort the data and view it by confidence, but you would have to scroll through the details.

Figure 7:
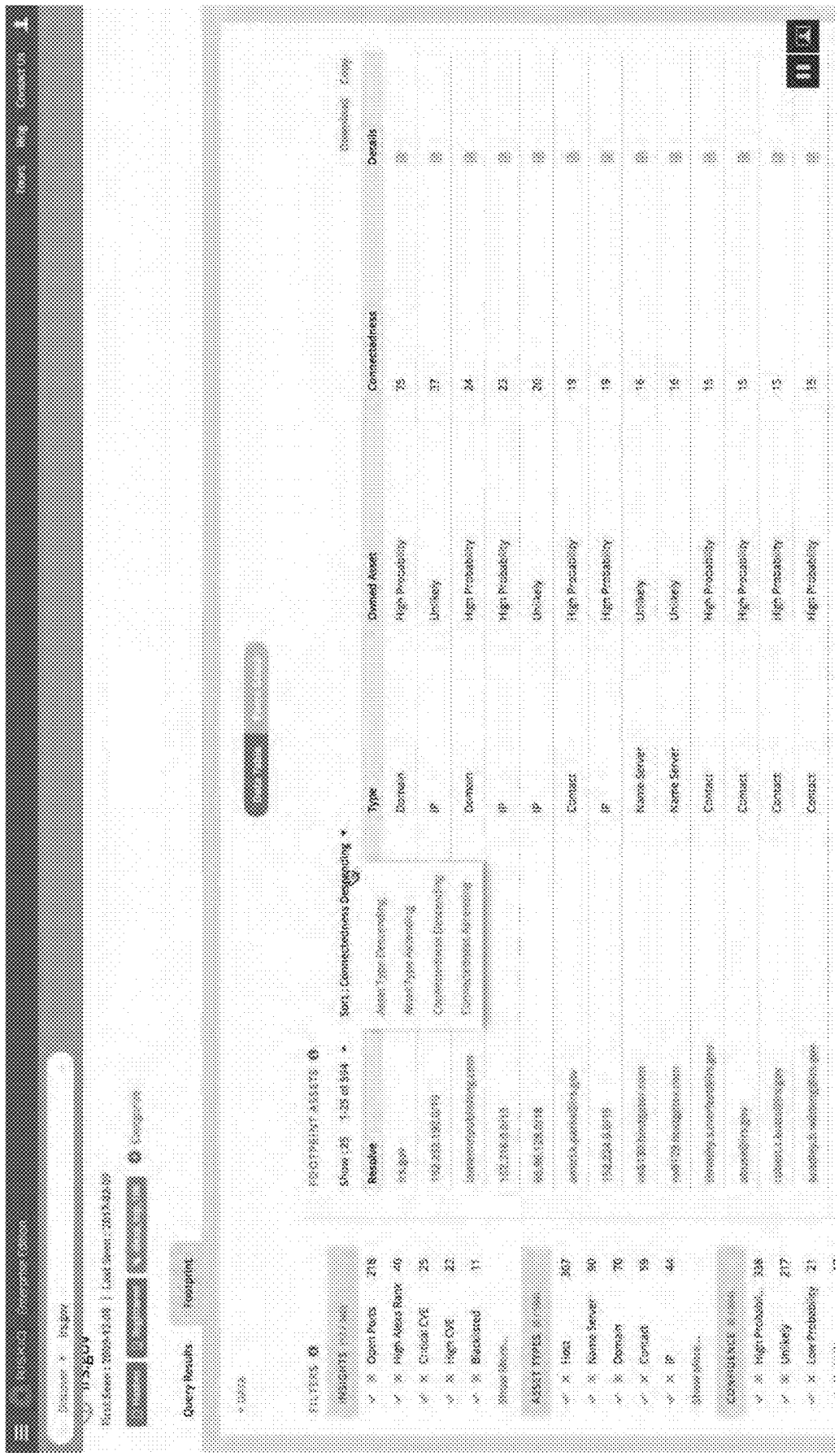
Figure 8:
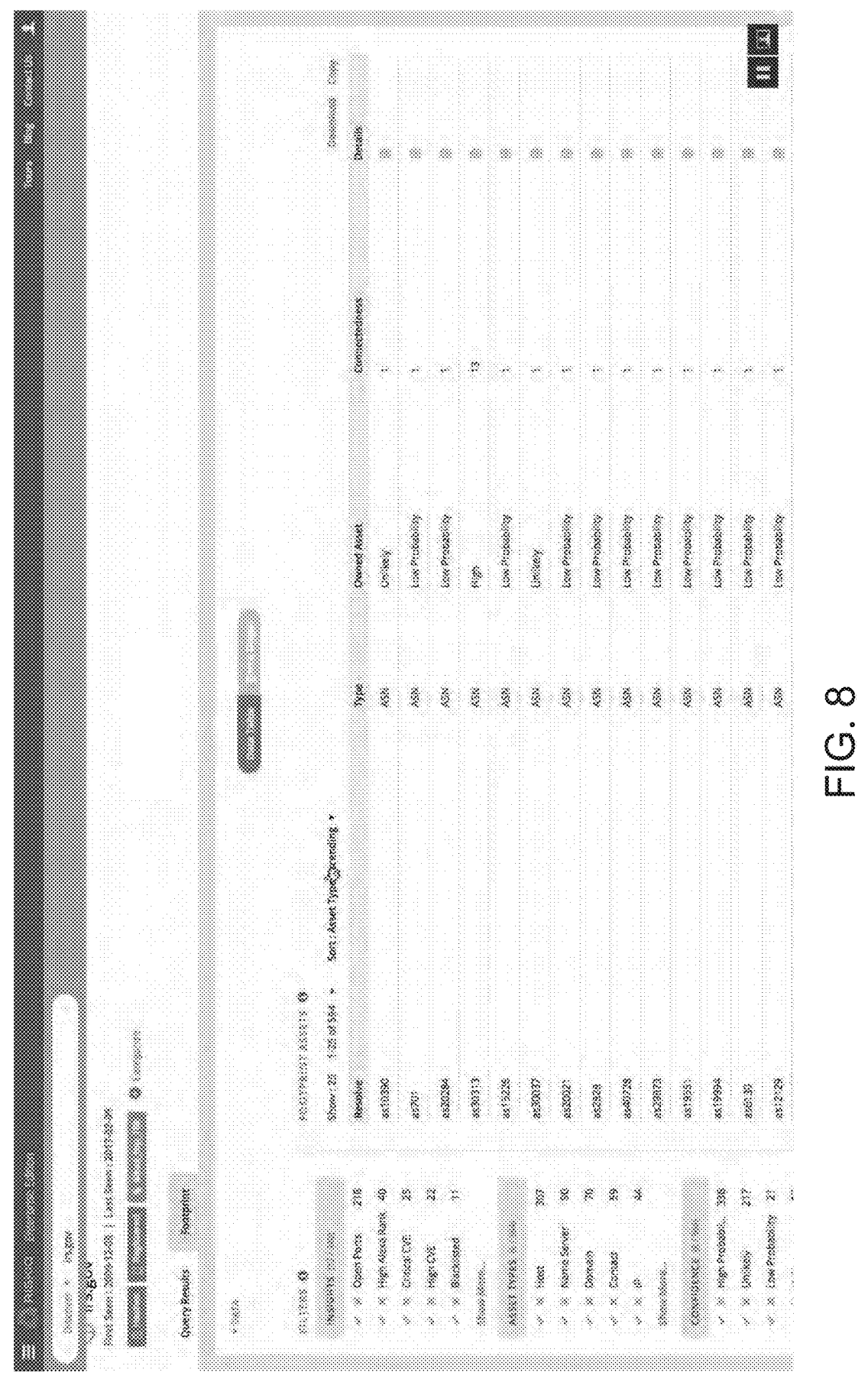

FIGS. 7 and 8 show the graphical interface of FIG. 6 enabling a user to interact with an element to sort data records based on one of the categories, such as asset type as shown in FIG. 3 or connectedness (also referred to as "connections") as shown in FIG. 7. The data table enables a view of a "digital footprint" or inventory assets in the data table.

Figure 9:
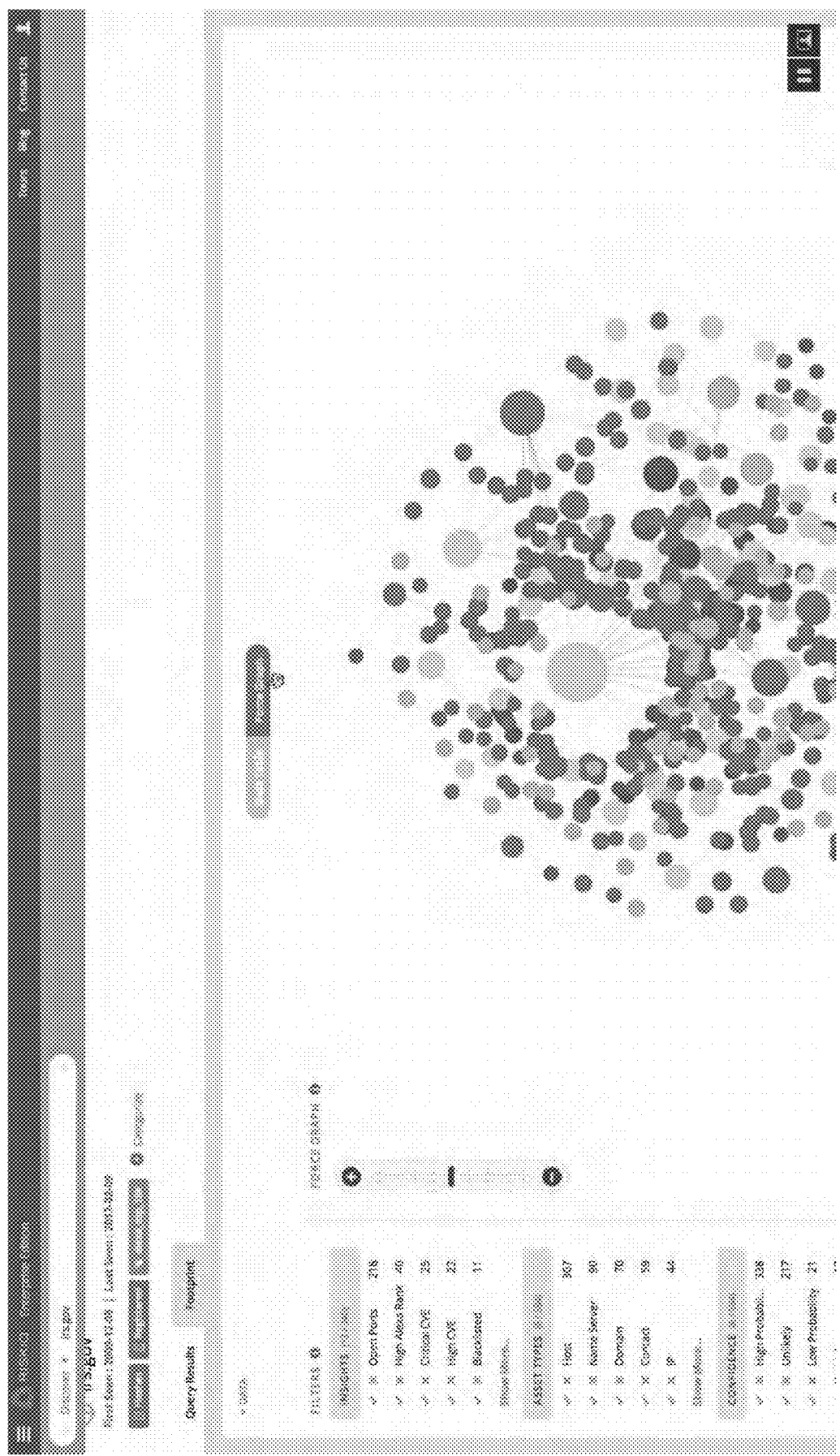

FIG. 9 shows a "force graph" view of related Internet assets. One or more different types of graphs may be displayed to show a digital footprint. The force graph shows a "digital footprint" of Internet-facing assets related to assets in an inventory of an entity. The force graph may be interactive to adjust a view (e.g., zoom). The force graph may be shown with a node (e.g., a circle or a dot), corresponding to each unique asset. Each node may be representative and associated with a record of data for the asset. Each node may be presented with one or more visual attributes (e.g., a size, a color, a shading, or an animation). The visual attribute(s) may be based on the underlying data. For example, the size of a node may be based on the number of connections the asset has with other assets. The color of a node may be indicative of the asset type. The graph enables a user to interact with the data of an asset quickly to get insights into Open Ports or other vulnerabilities. The graph can quickly show to a user various connections between assets. Similar to FIG. 6, filtering may remove data records based on the filtering, such that the graph is updated to reflect the data based on the filtering.

Figure 10:
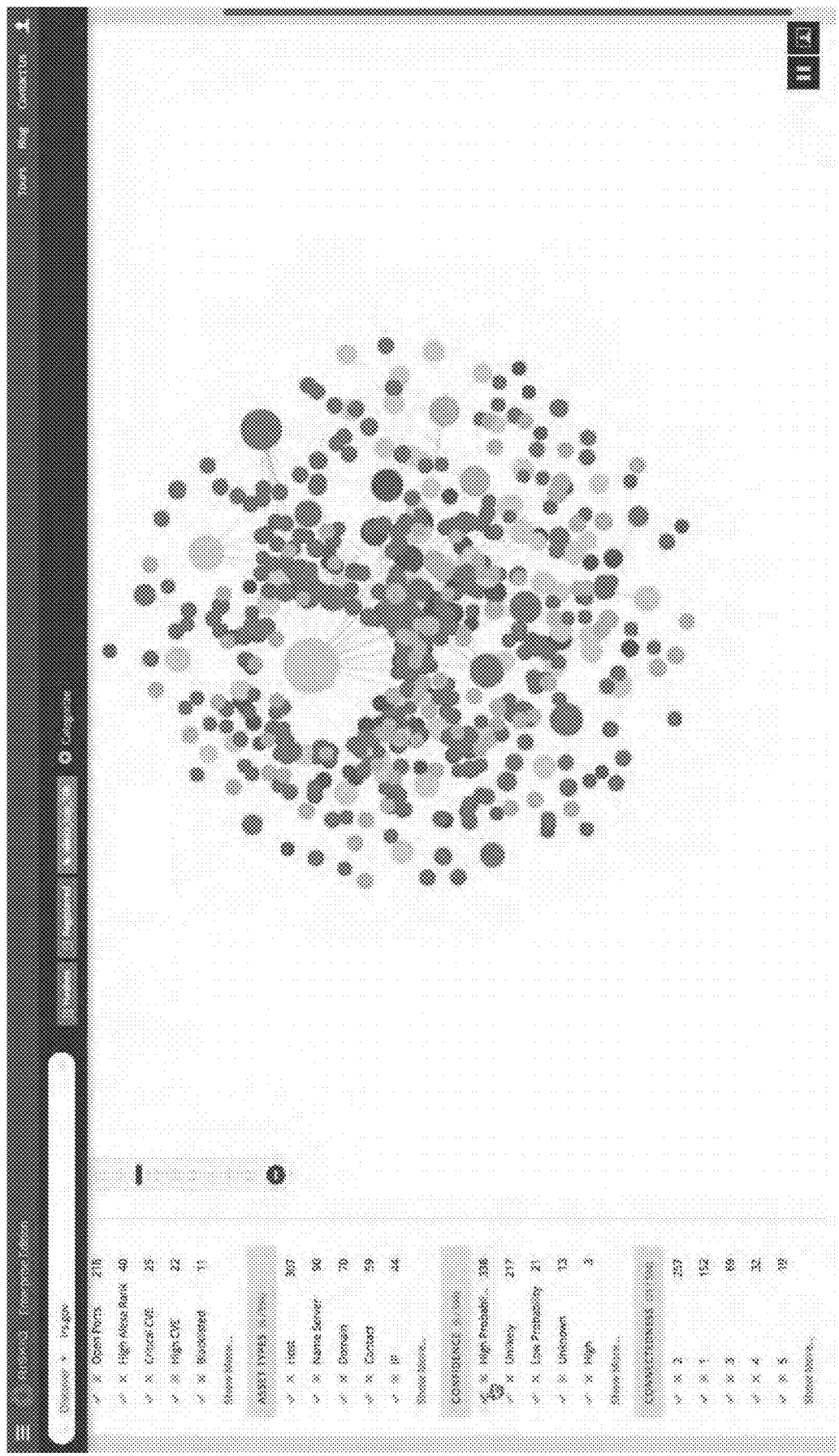

Continuing with FIG. 10, the graph may be displayed to reflect a measure of confidence of a relationship between assets. The confidence may be used as a filter to show only those assets with a desired level of confidence relationship with assets in an inventory.

Figure 11:
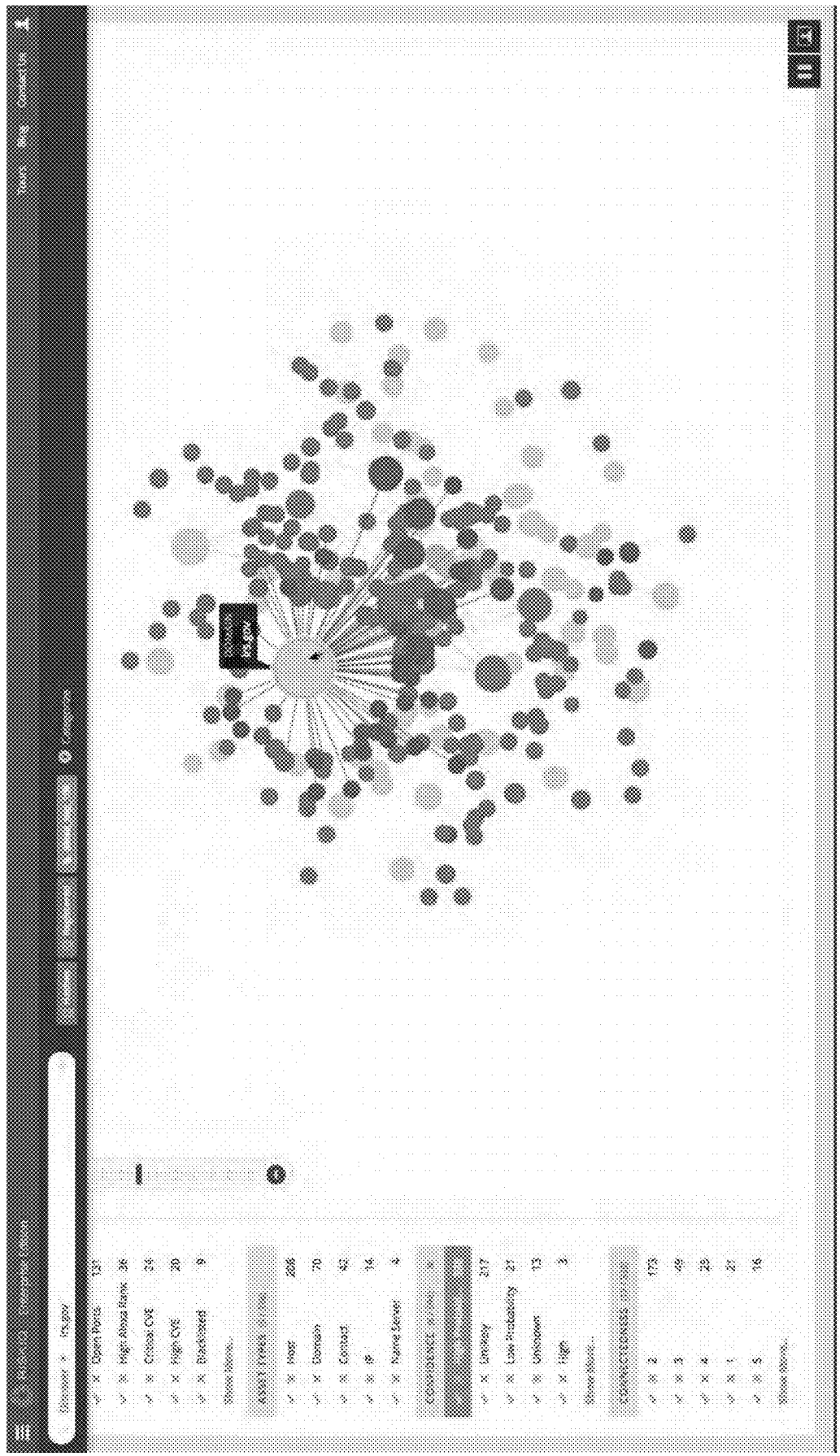
Figure 12:
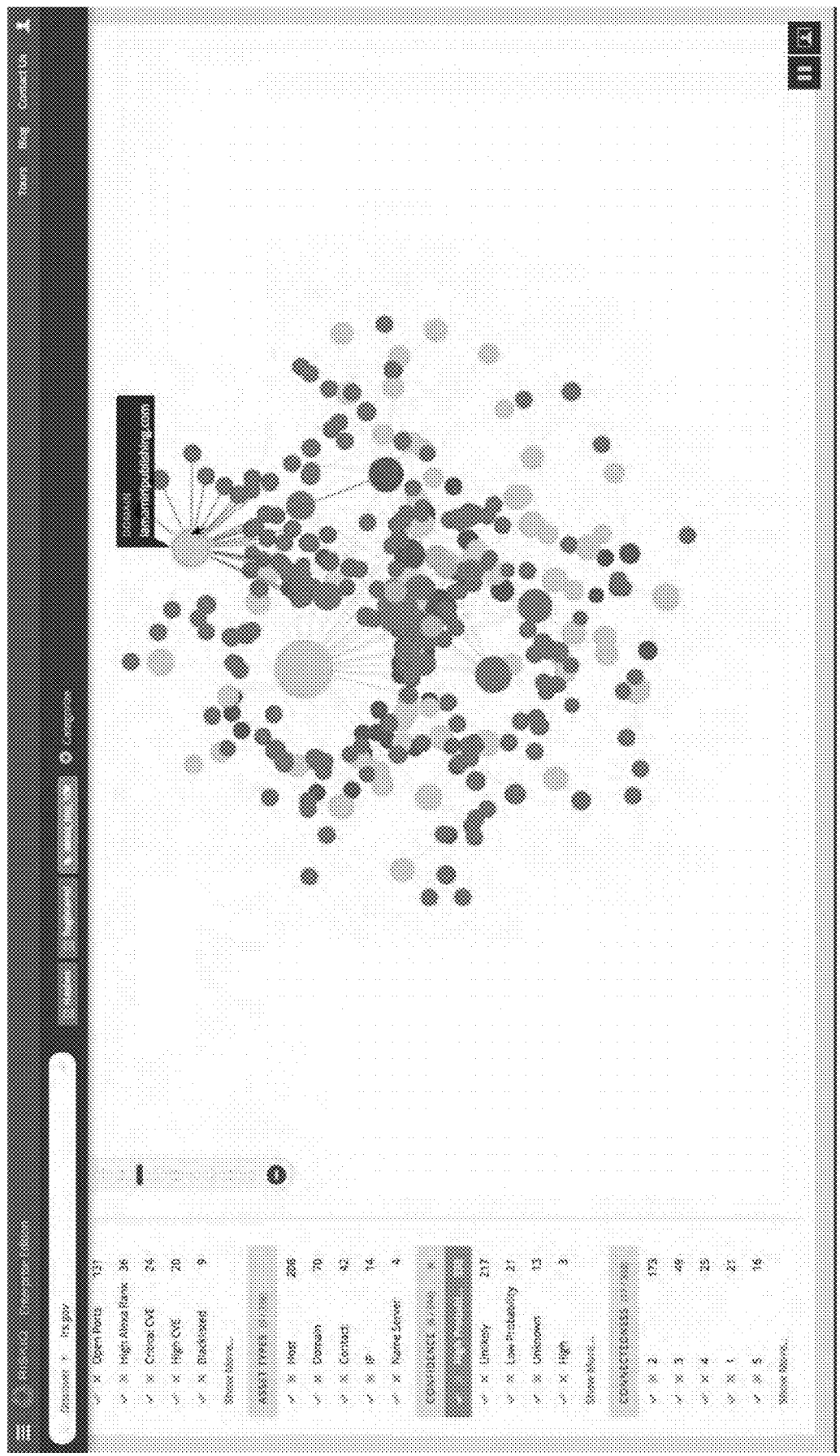
Figure 13:
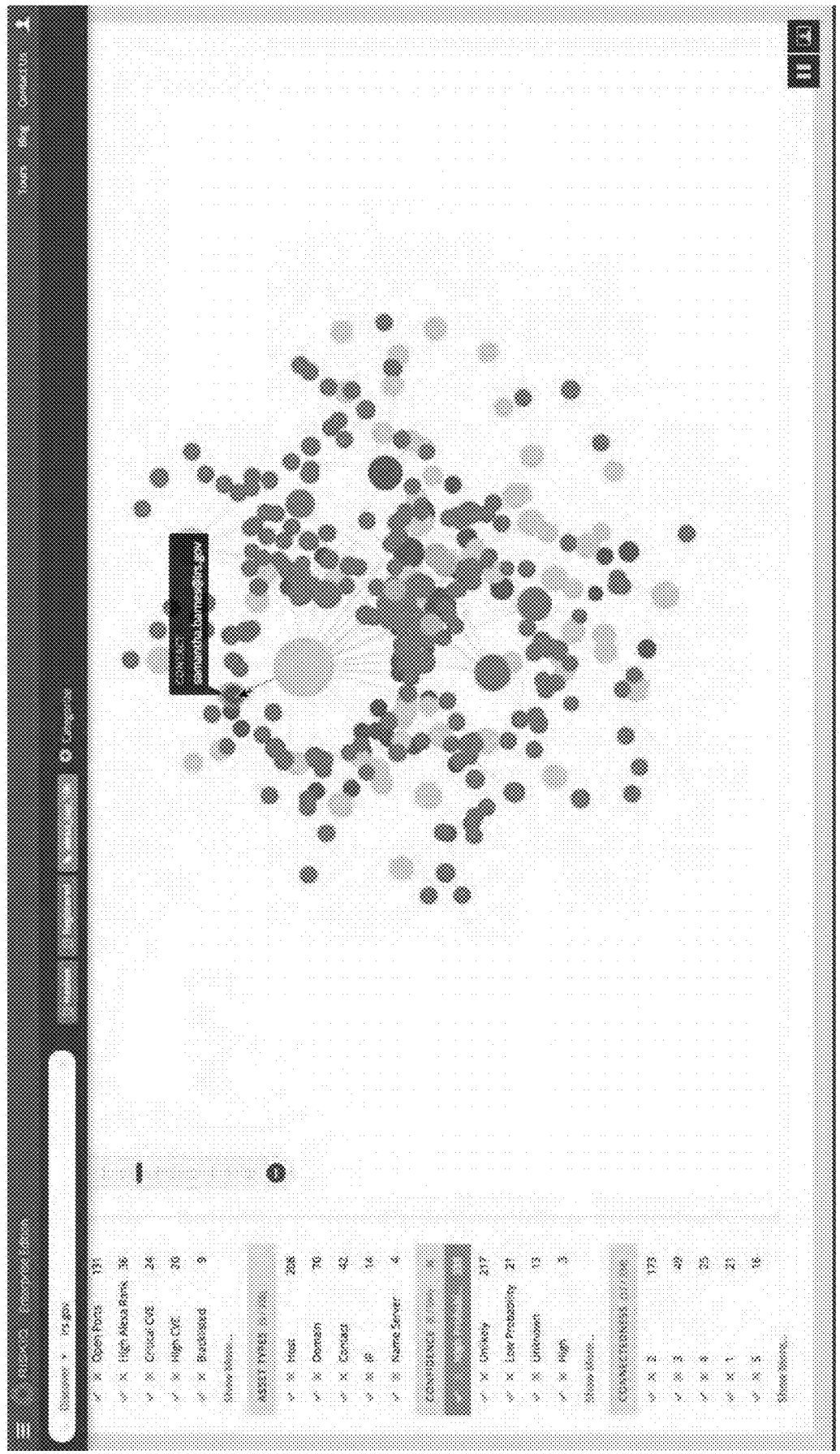

In FIG. 11, one can immediately see by yellow for domain name assets, that most of the IRS assets are coming from the domain "irs.gov." Interaction with a node may cause the graph to be modified to show additional information, which can be visualized (e.g., color). The graph may highlight or emphasize connections from a particular node based on interaction with that node. Now turning to FIG. 12, a user is able to spot fairly immediately that there is an asset, such as a domain "iamamiripublishing.com," which one would not think has any relationship to the IRS. The domain may be identified as a related asset based on the visual connection shown in the graph. The analysis for the force graph has indicated that the domain a high probability of connectedness with many connections to other assets within the IRS inventory similar to "irs.gov" as one can see from the visualization. As another example, FIG. 13 shows how one can immediately locate through the orange color, a contact asset for the "irs.gov" asset if there was an issue on that domain name. The contact asset is shown as having a connection with both domains, "irs.gov" and "iamamiripublishing.com." The contact may have used an IRS contact address for both domains.

Figure 14:
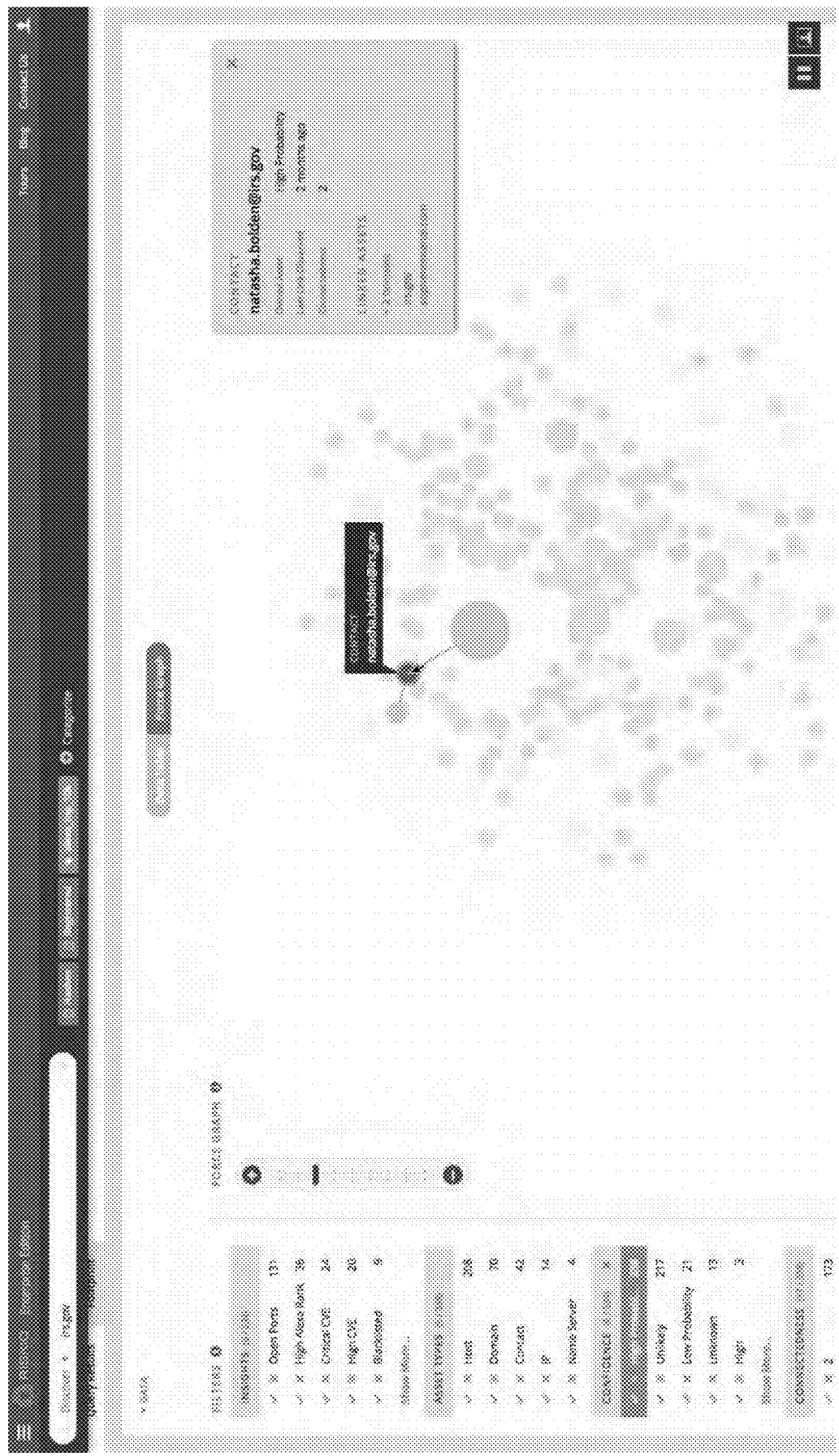

Now in FIG. 14, the user sees that a contact for "irs.gov" is natasha.bolden@irs.gov. Interacting with a node, such as the node for the contact, another graphical interface may be displayed with information about the node. For example, hovering over the node for the contact, and/or clicking on it, may show a graphical interface with information about natasha.bolden@irs.gov. The graphical interface may indicate information such as a measure of confidence about the asset in relation to the inventory of the assets for the IRS. The graphical interface may indicate connectedness information and date information in relation to that asset. The graphical interface may indicate one or more related, or linked assets, such as irs.gov and a website ("sophenomenal.com"). The website may be identified as unexpected given that it is a commercial domain name not on top level domain (e.g., ".gov"), but using "irs.gov" contact information.

Figure 15:
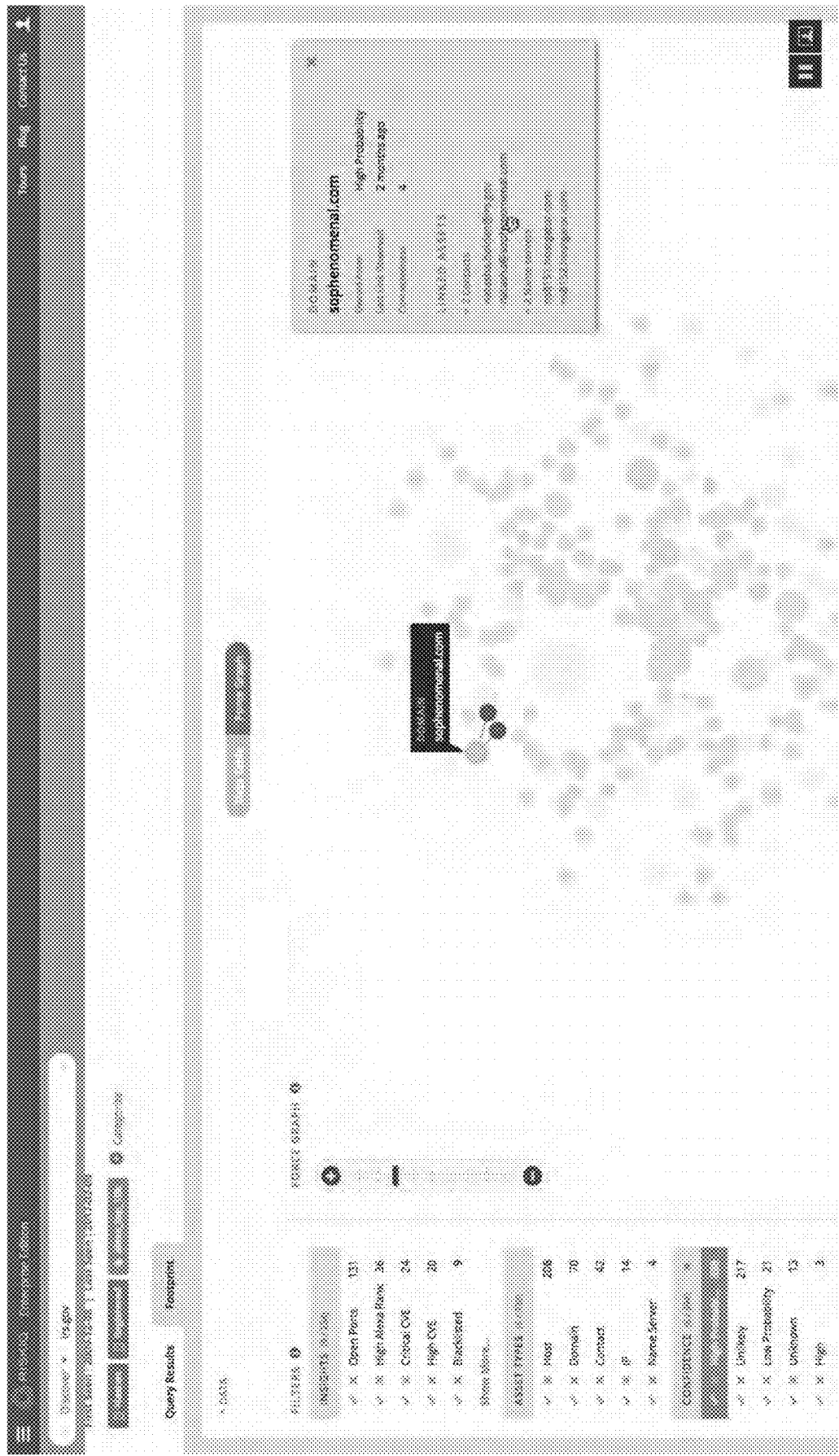

By clicking on domain for the website that is a linked asset, in FIG. 15, the graphical interface shows information about the asset for the domain of the website. The information about the domain may indicate that the contact information is registered for the domain, such that a user can immediately see that "Natasha Bolder" is running the commercial site through an email account associated with <sophnomenal.com> using non-governmental name servers with Hostgator indicated by the name servers in the information of the graphical interface displayed for the node of the domain asset.

Figure 16:
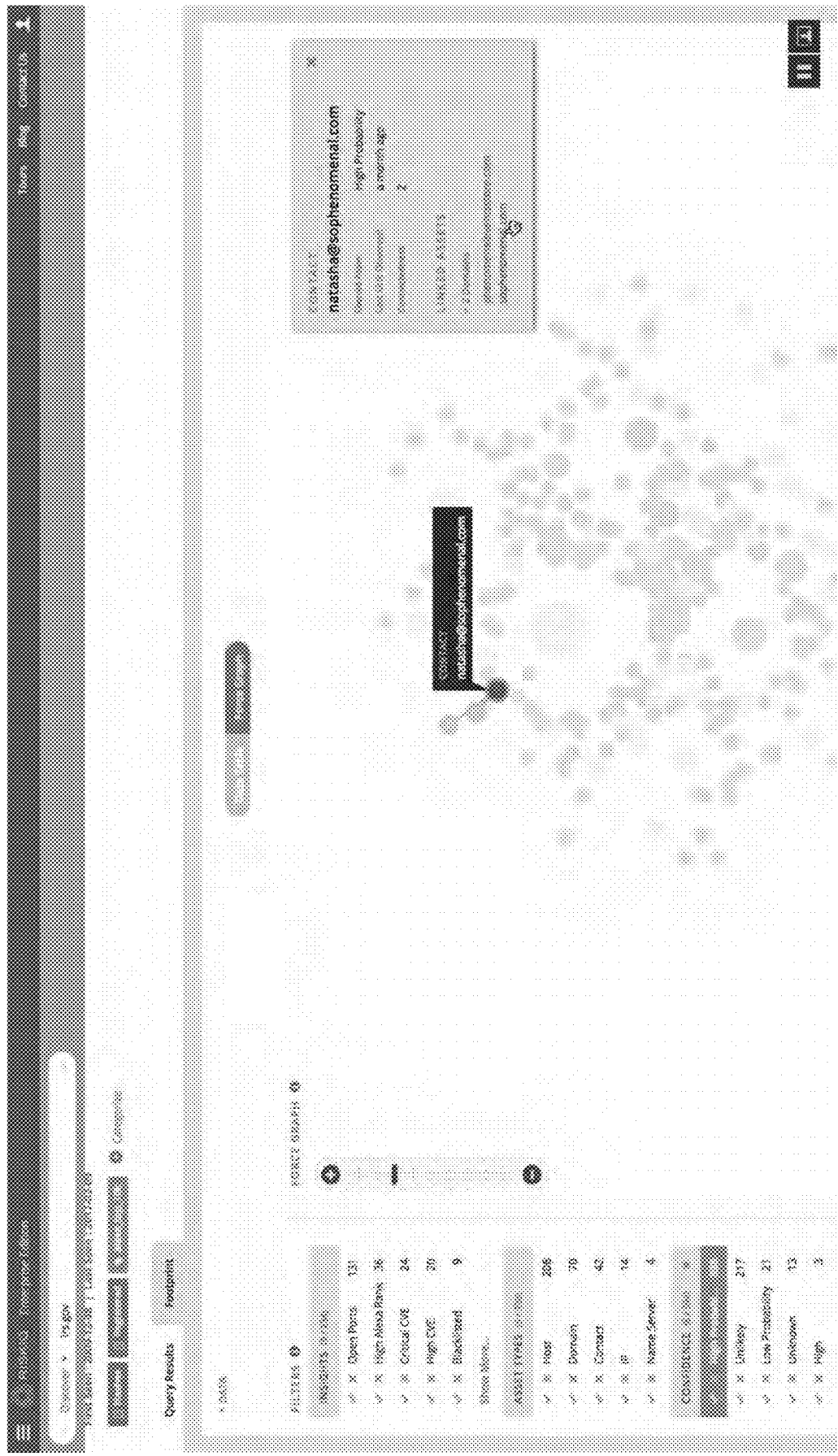
Figure 17:
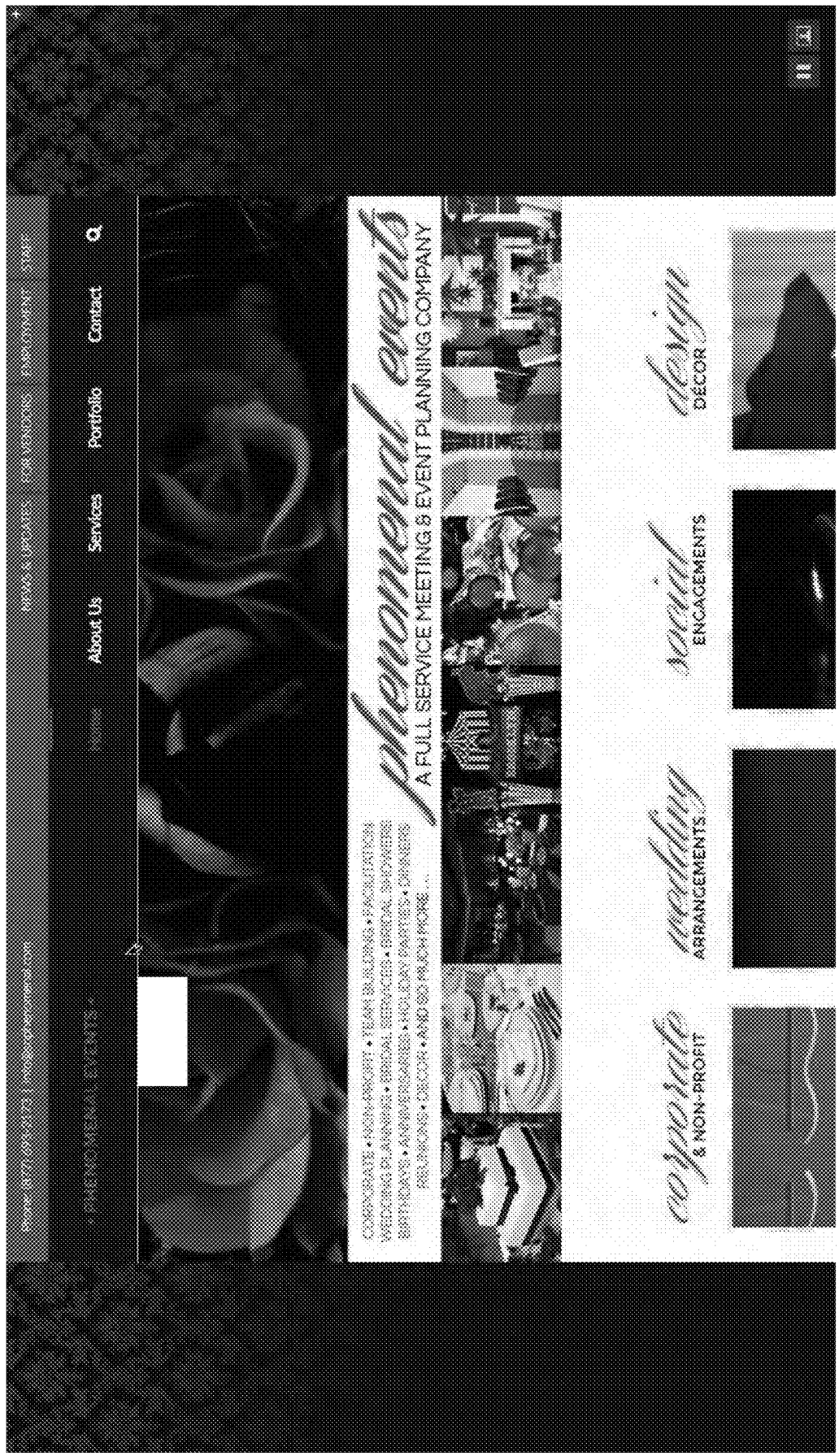
FIG. 17 illustrates an example web page of an example node representing an asset of the asset discovery platform.

If the user wants to quickly explore the private email address that Natasha is using by clicking on that contact, the user can see additional private domains using her account shown in in FIG. 16. FIG. 16 shows a graphical interface of information for the contact asset, which includes information about domains that are registered with the contact information. Interacting with the website of the domain in the node or the graphical interface may cause the website to be displayed, as shown in FIG. 17 for "sophenomenal.com."

Viewing the website further reveals that the domain does not appear to have any government connections to the IRS whatsoever.

Figure 18:
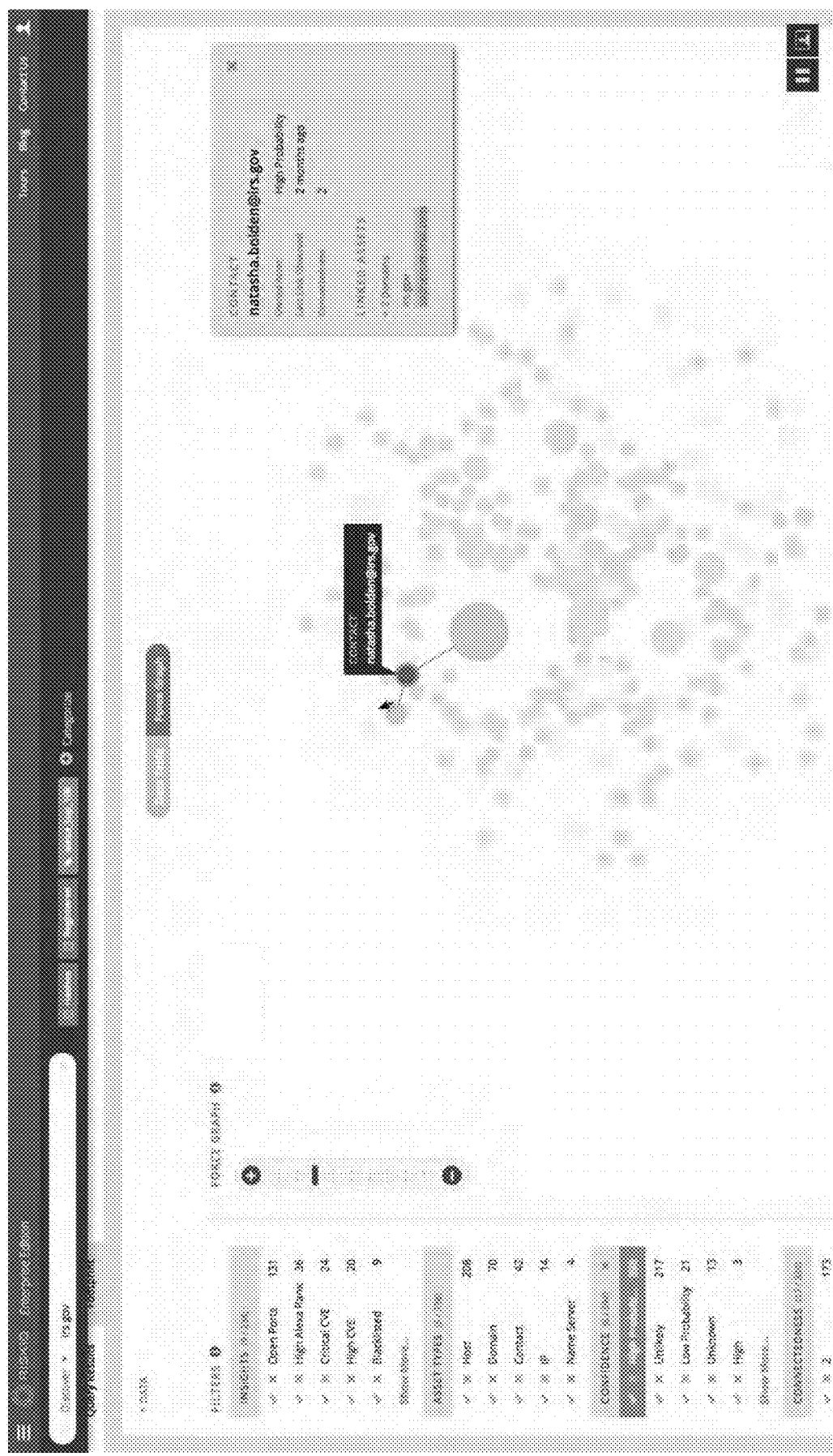
Figure 19:
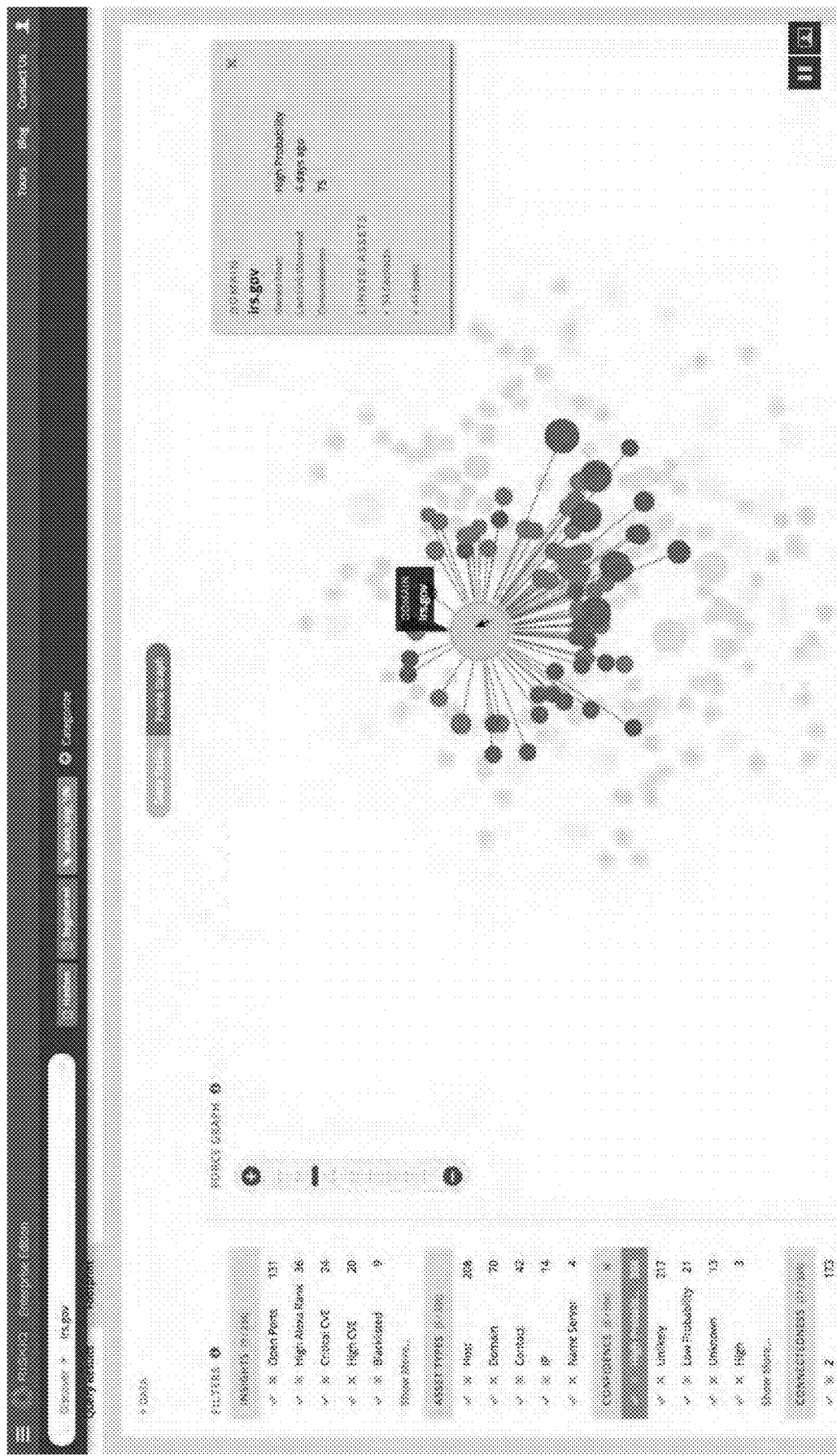

Because the domain was shown to have a high probability of being connected to the entity IRS, the user may interact with the graphical interface quickly click again to confirm the connection to "irs.gov" as shown in FIGS. 18 and 19. This shows a user a clear vulnerability in the IRS insofar as its employee is using government resources, namely her account, in connection with a commercial website, or it is a covert site that is being exposed.

Figure 20:
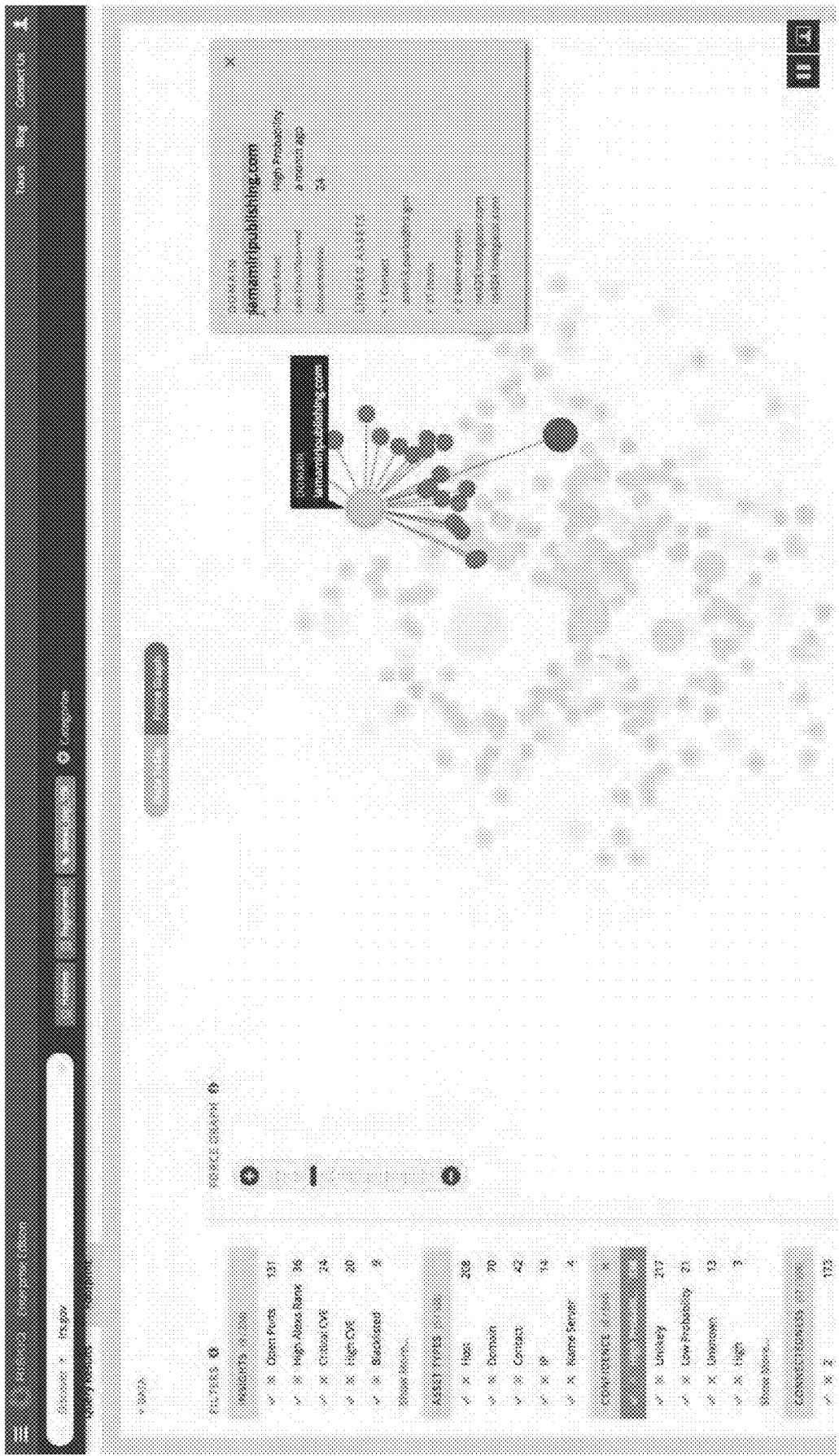
Figure 21:

FIGS. 20 and 21 show an example of displaying a graphical interface showing information in a graphical interface about the domain asset for domain name "iamamiripublishing.com." The information may be obtained from one or more data sources, such as a Whois registration data source. For example, information obtained from a WHOIS registration data source may look as follows:
Domain Name: IAMAMIRIPUBLISHING.COM
Registrar: LAUNCHPAD.COM, INC.
Sponsoring Registrar IANA ID: 955
Whois Server: whois.launchpad.com
Referral URL: http://www.launchpad.com
Name Server: NS433.HOSTGATOR.COM
Name Server: NS434.HOSTGATOR.COM
Status: clientTransferProhibited https://icann.org/epp#clientTransferProhibited
Updated Date: 19 Dec. 2016
Creation Date: 8 Dec. 2012
Expiration Date: 8 Dec. 2018
>>>Last Update of Whois Database: Thu, 9 Feb. 2017 14:02:43 GMT<<<

Figure 22:
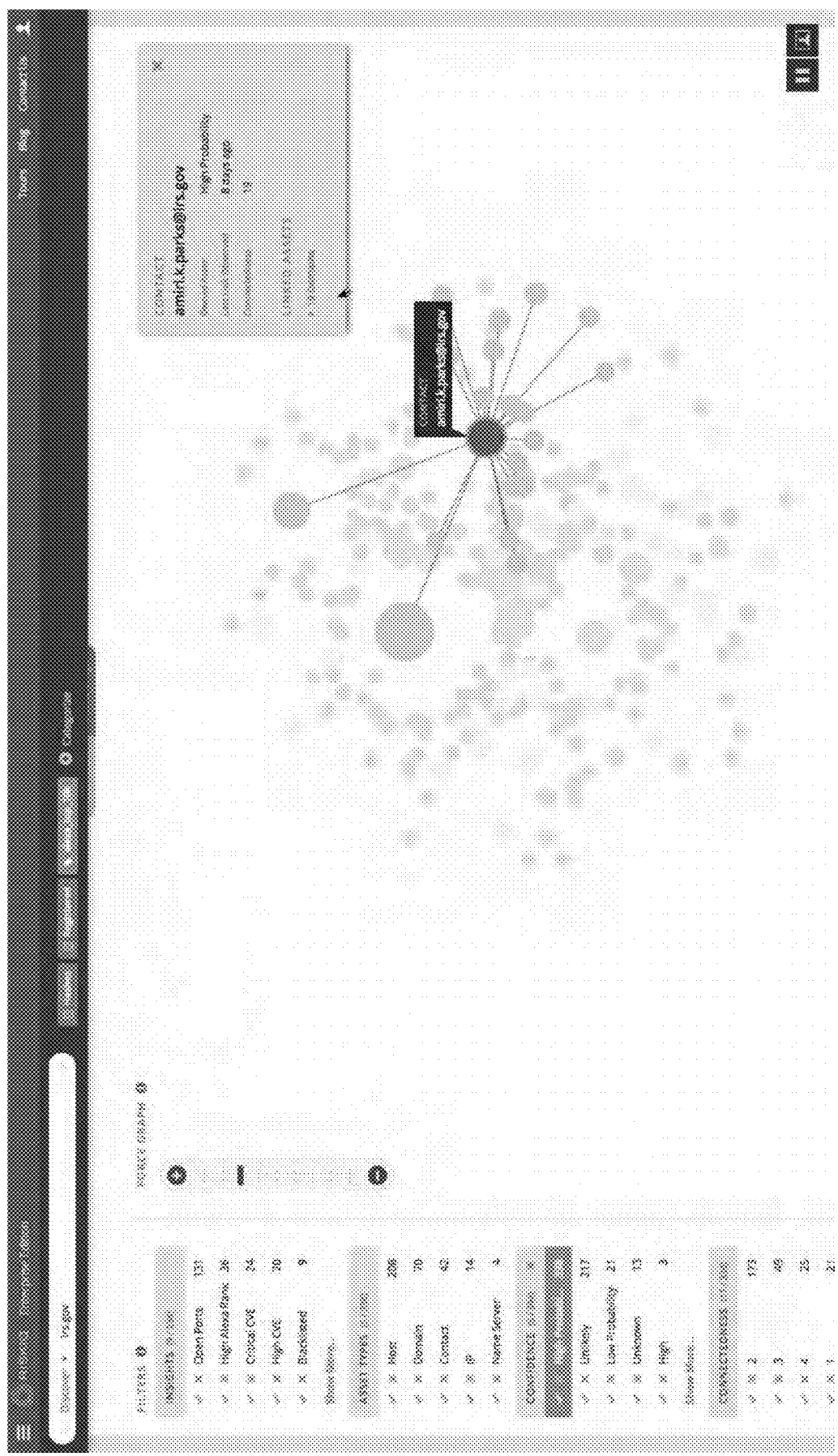
Figure 23:
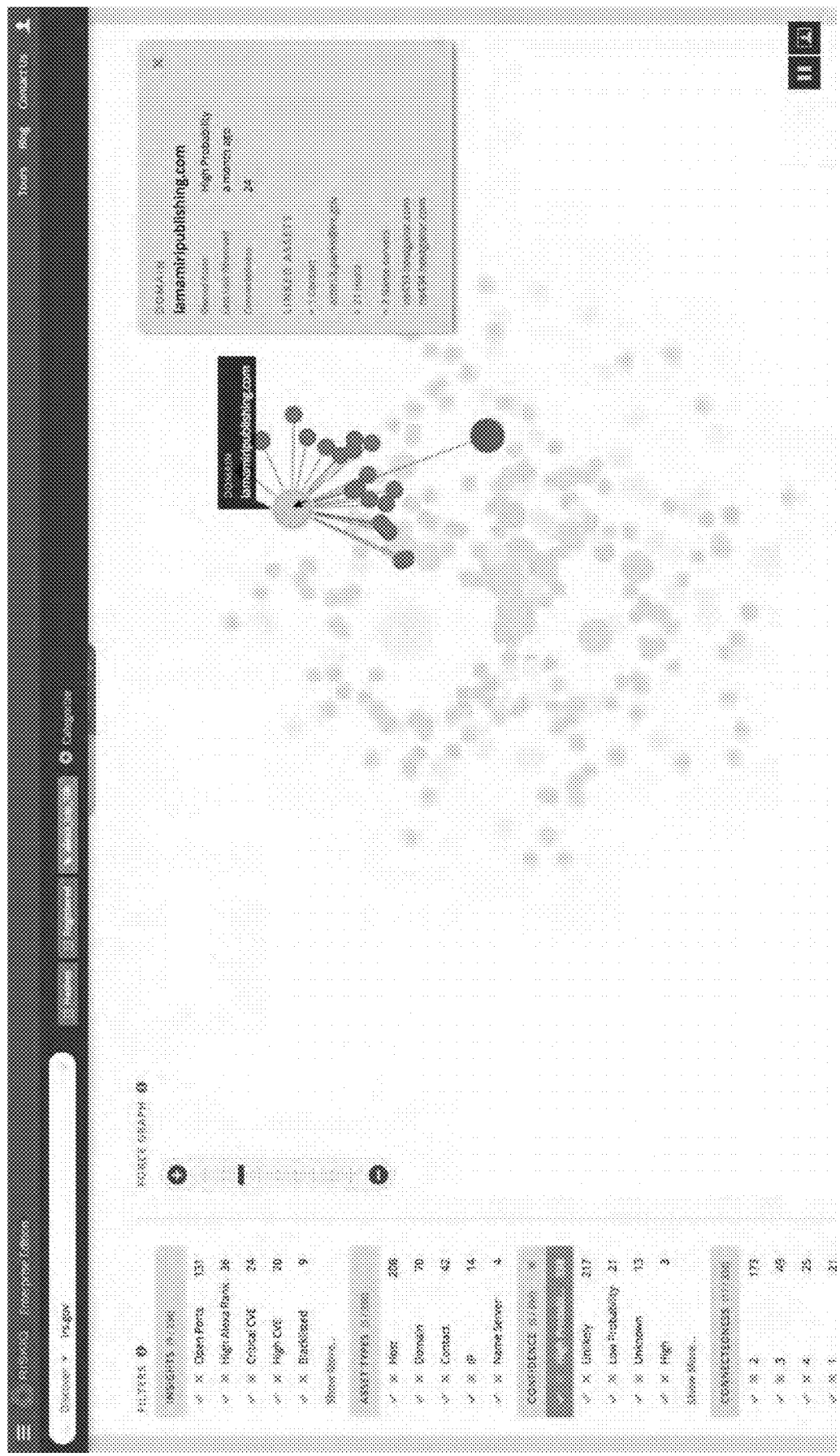

The information may be useful to a user to verify that the government accounts are being used with these commercial websites as discovered quickly through the interface. In FIG. 21, the user clicked on "iamamiripublishing.com" the graphical interface of information about the domain name is shown. In FIG. 22, selecting the "contact" in the graphical interface of FIG. 21 may cause the graph to be displayed differently to highlight the node for the contact and the connections to the node. In FIG. 23, the user can switch back to the view of the graph with the node for the domain in FIG. 21 to understand the connectedness of this purportedly or actual private commercial site to the IRS.

Figure 24:
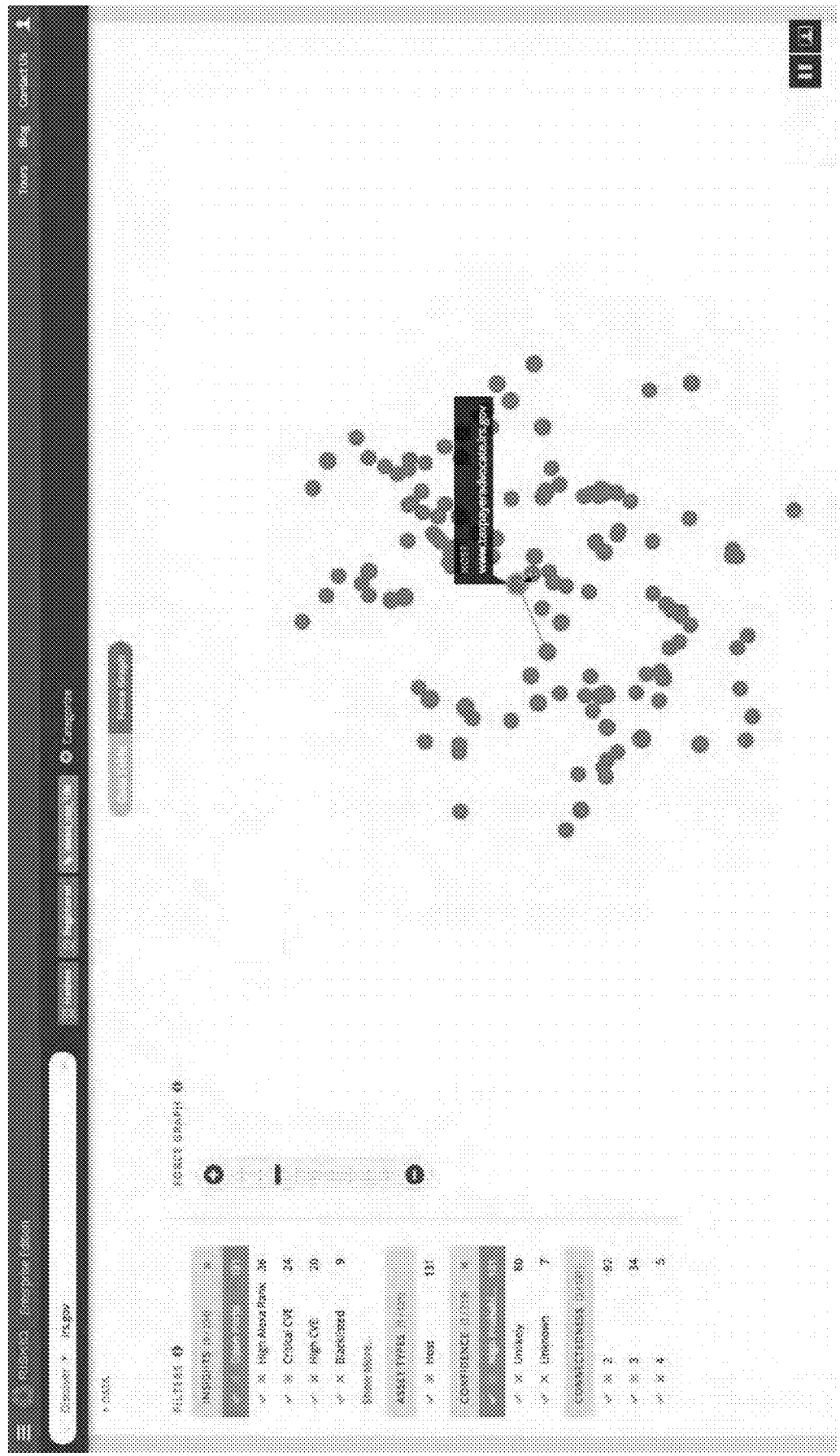
Figure 25:
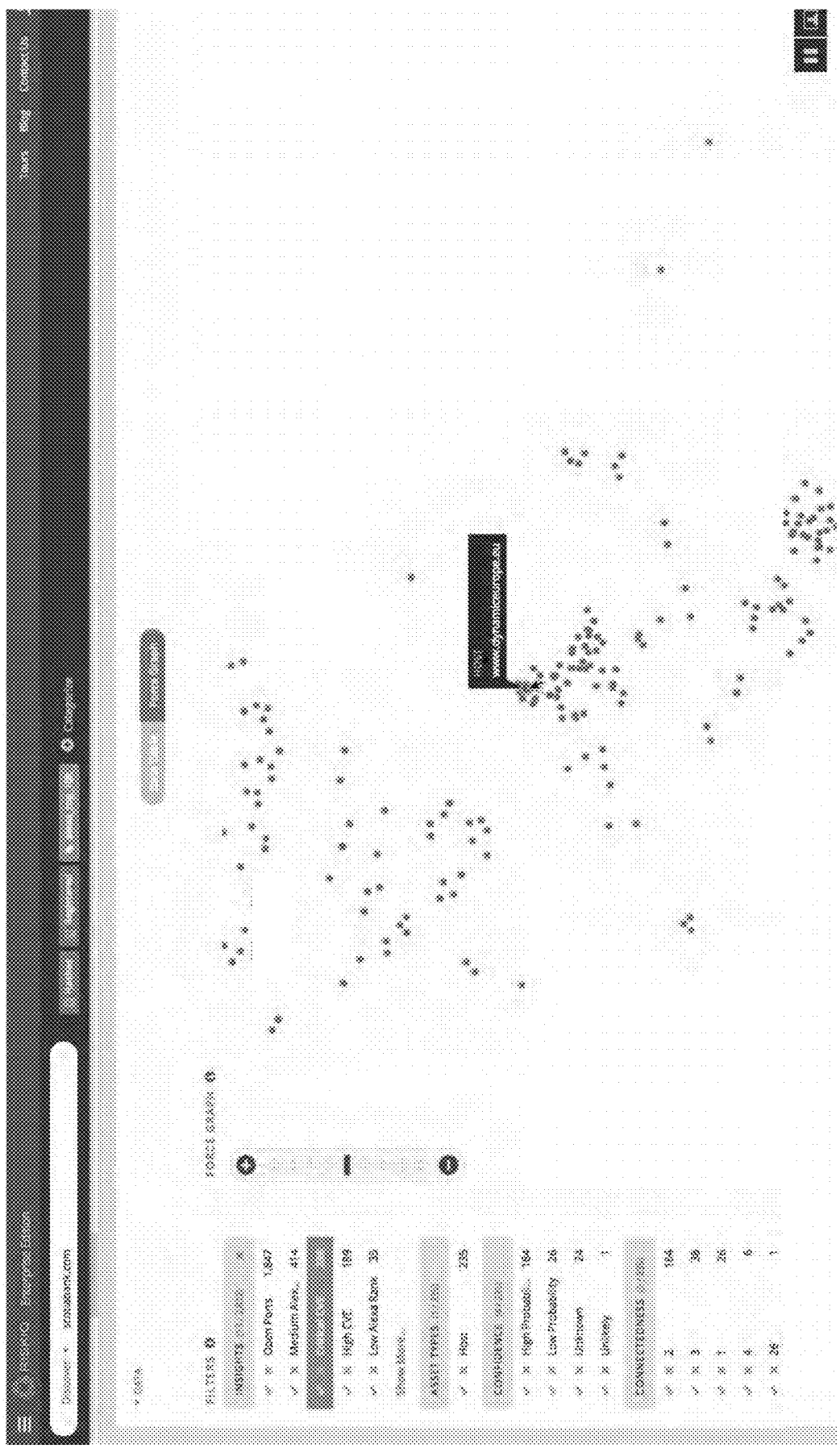
Figure 26:
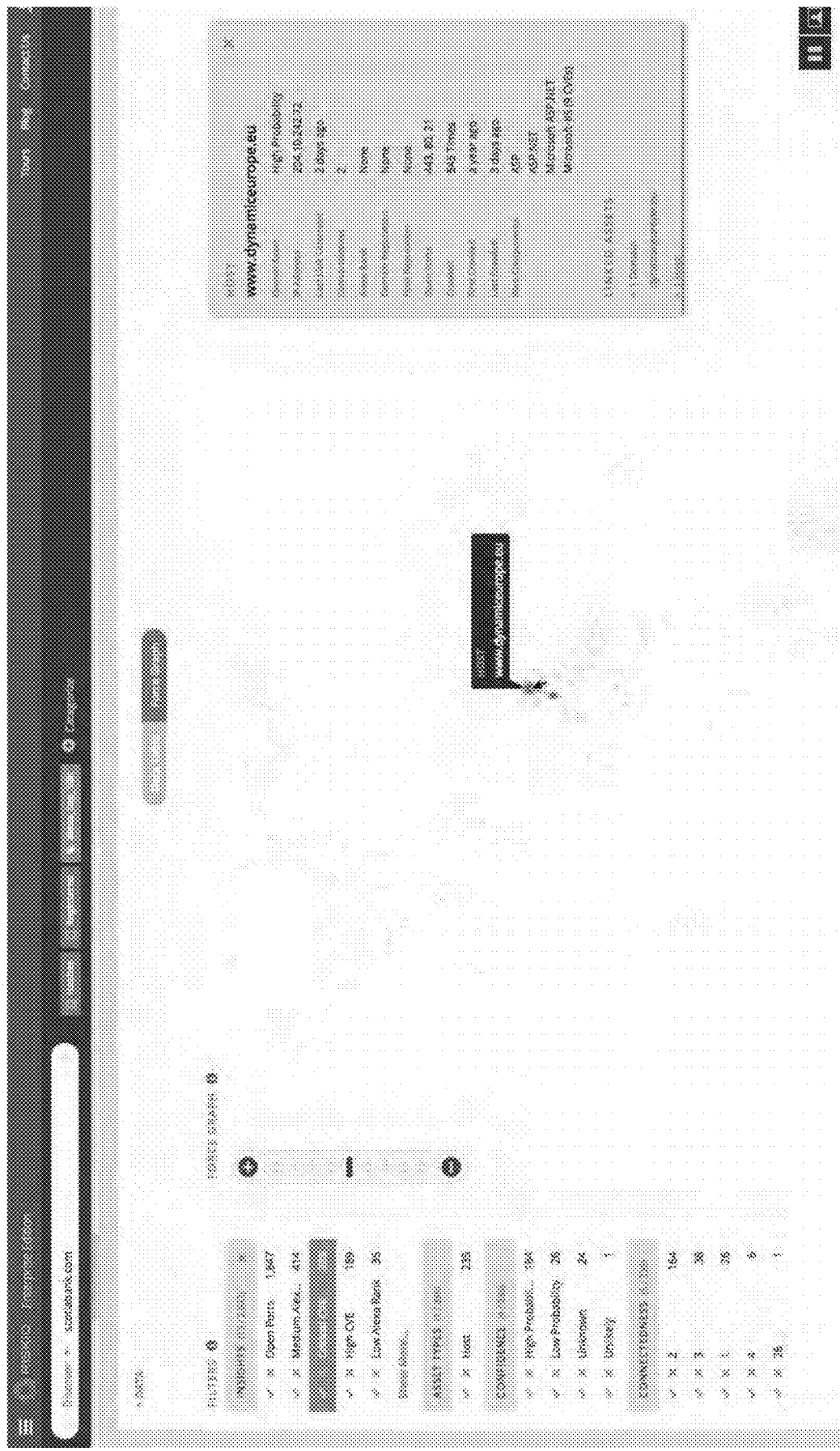
Figure 27:
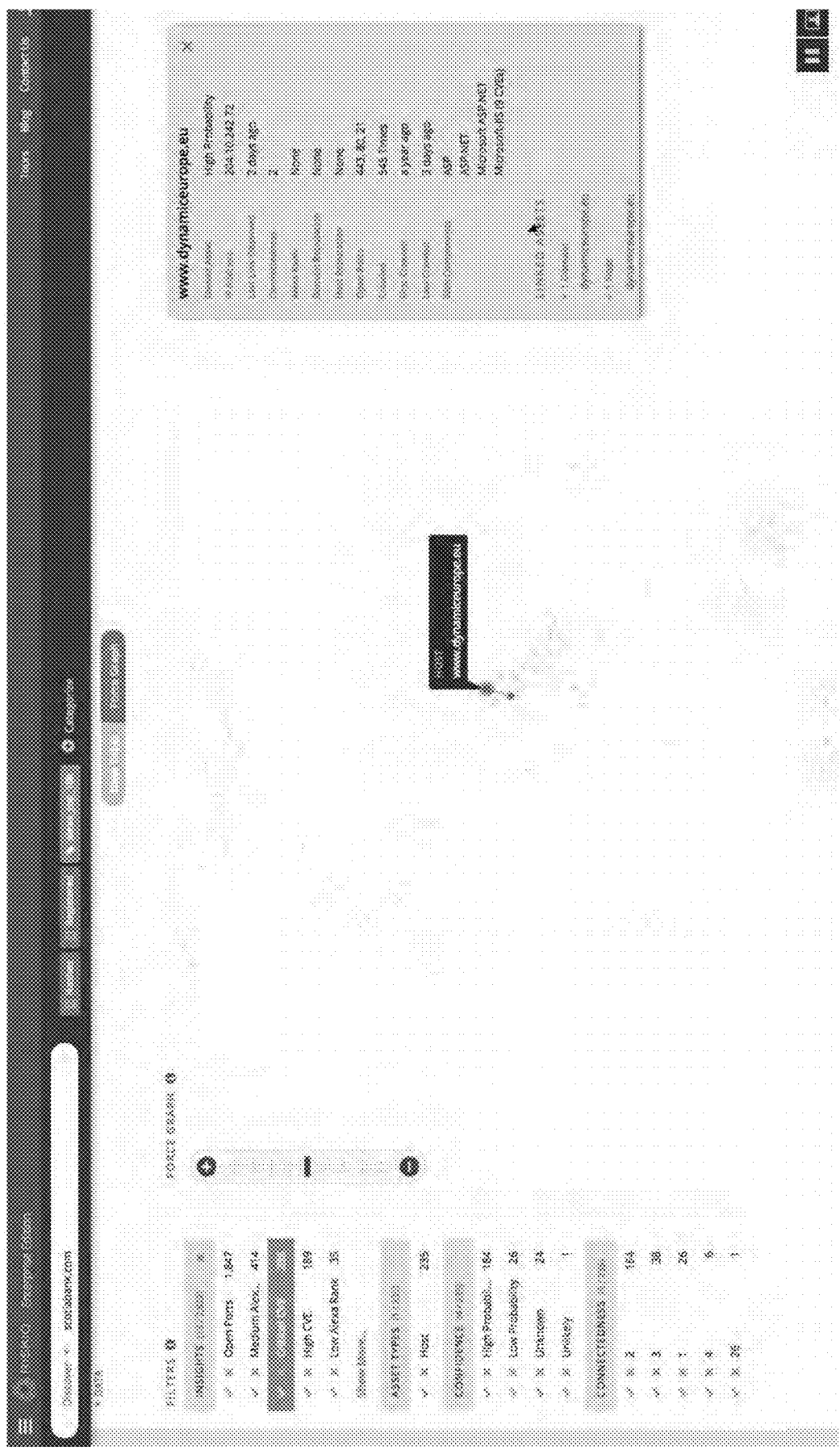
Figure 28:
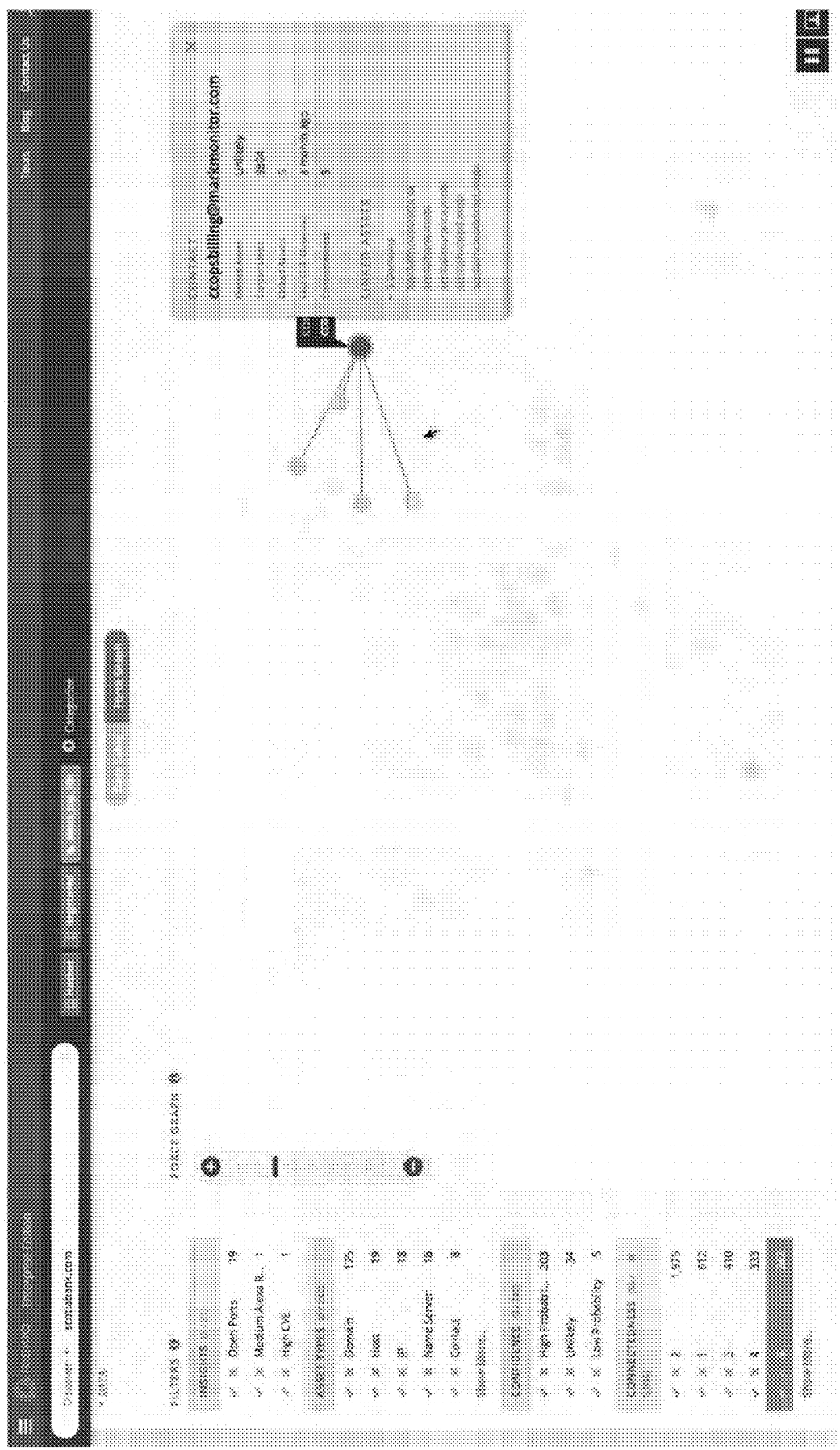
Figure 30:
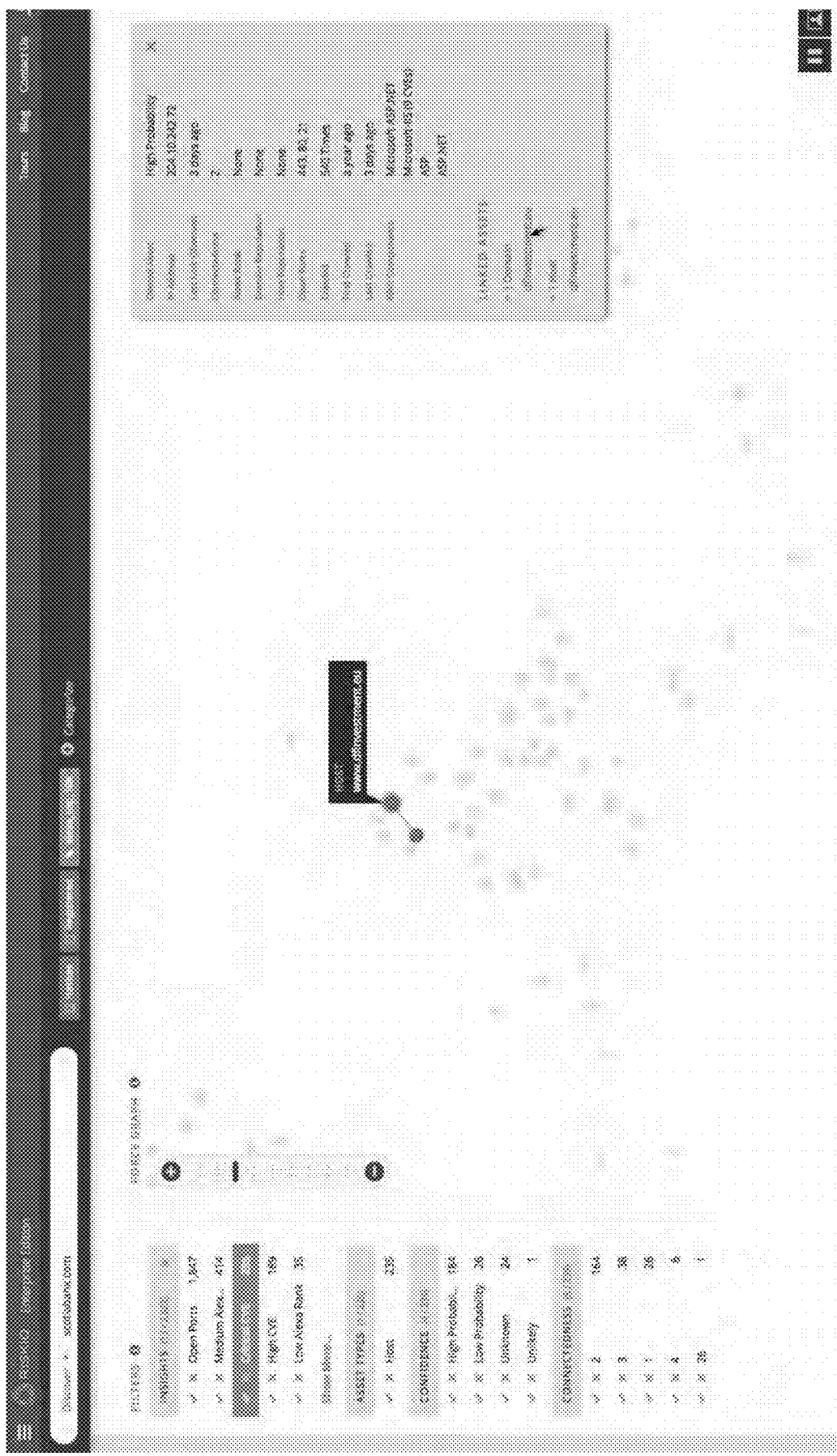
Figure 31:
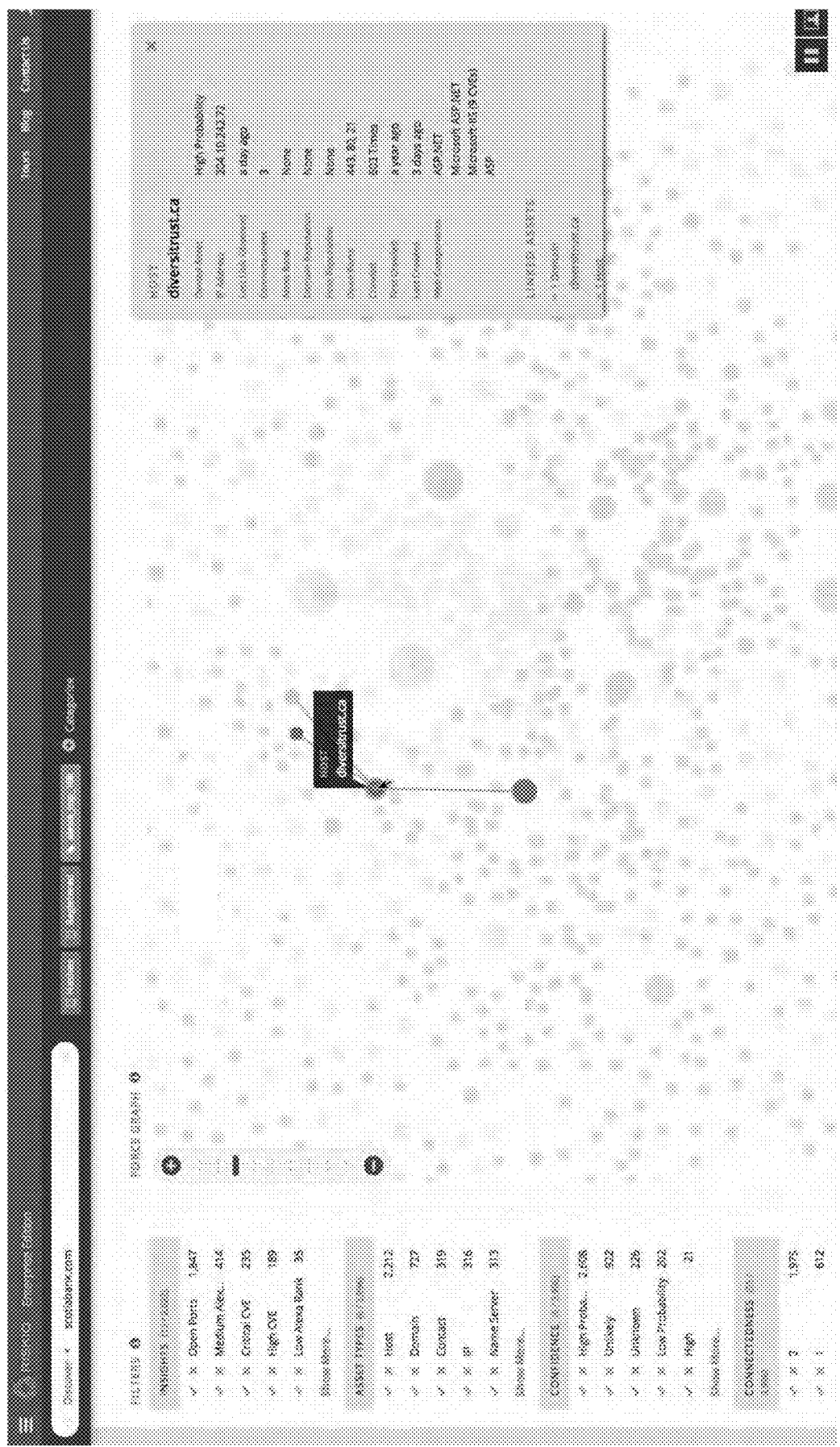
Figure 32:
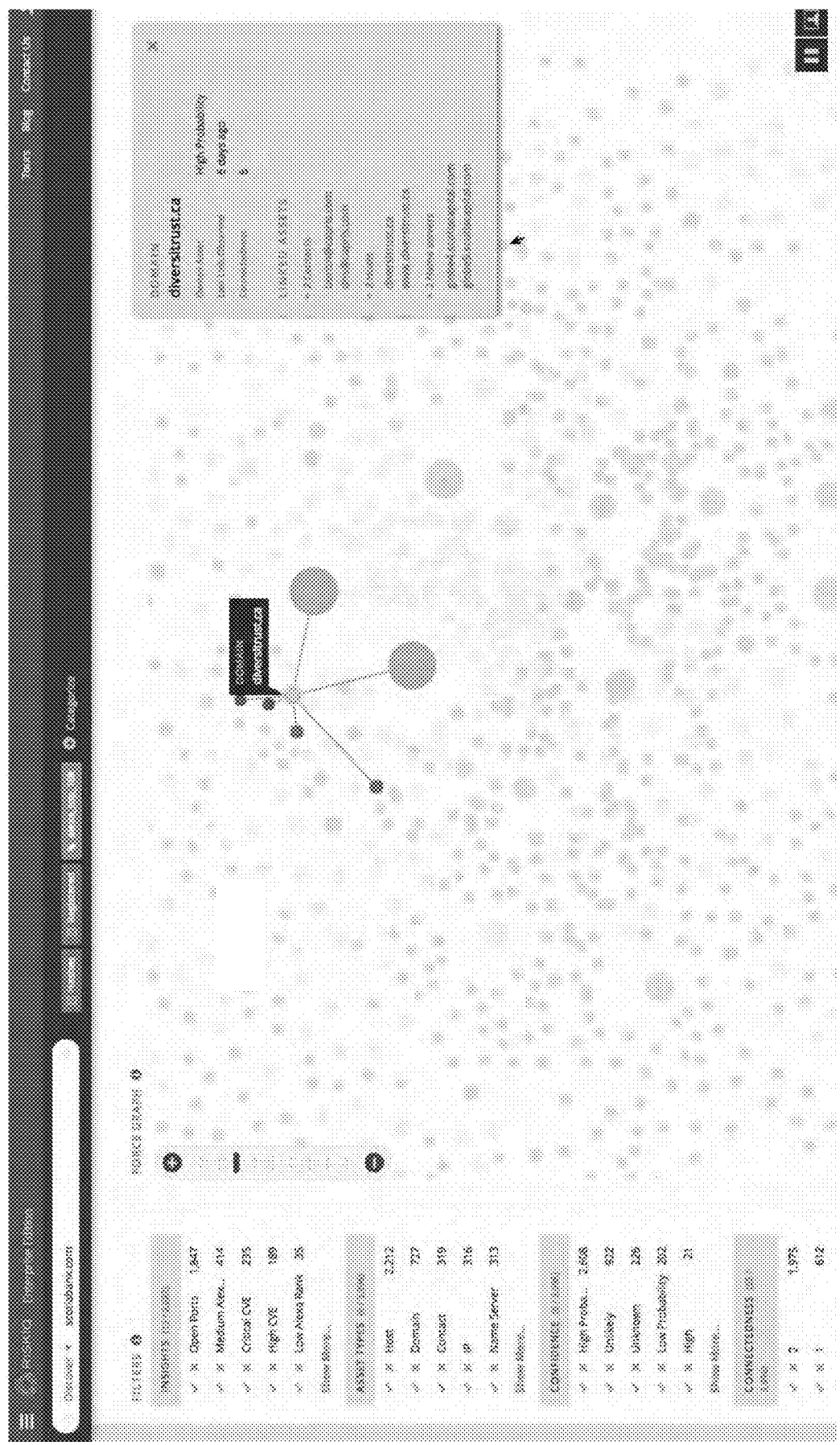

FIG. 24 shows a graphical interface of the graph when a user selects "Open Ports" insight and "High Probability" confidence filters to view assets identified by open ports of CVE for assets with a high probability of being part of the IRS's inventory. It shows that there is an open port on the independent organization within the IRS, TAS, which is set up to protect rights for taxpayers but has vulnerabilities. FIGS. 25 and 26 show a user perusing critical CVE by Hosts from entering into the browser "scotiabank.com" and interacting with the "digital footprint" results Immediately, the user can scroll down in the window to see which Web components are associated with the asset "dymaniceurope.eu" as shown in FIG. 27. FIG. 28 shows how although a contact is used at the corporate registrar for numerous domains within the inventory, it is not actually the bank's asset, so if the user clicks to see only absolute or relatively high confidence assets managed by the bank as opposed to by their corporate registrar, the MarkMonitor email account disappears. FIGS. 29 and 30 show a user clicking to view critical CVEs and being able to traverse the linked assets. FIGS. 31-32 shows a user traversing from a domain to the linked assets to explore them. This allows the user to use the insights to understand how the elements impact on the infrastructure, and possibly how to resolve them such as by reaching a point of contact. For a Host that has a critical CVE, the user can hover over to linked assets and then continue to hover over to a contact point to tell them, for example, to upgrade their software version.

Figure 34:
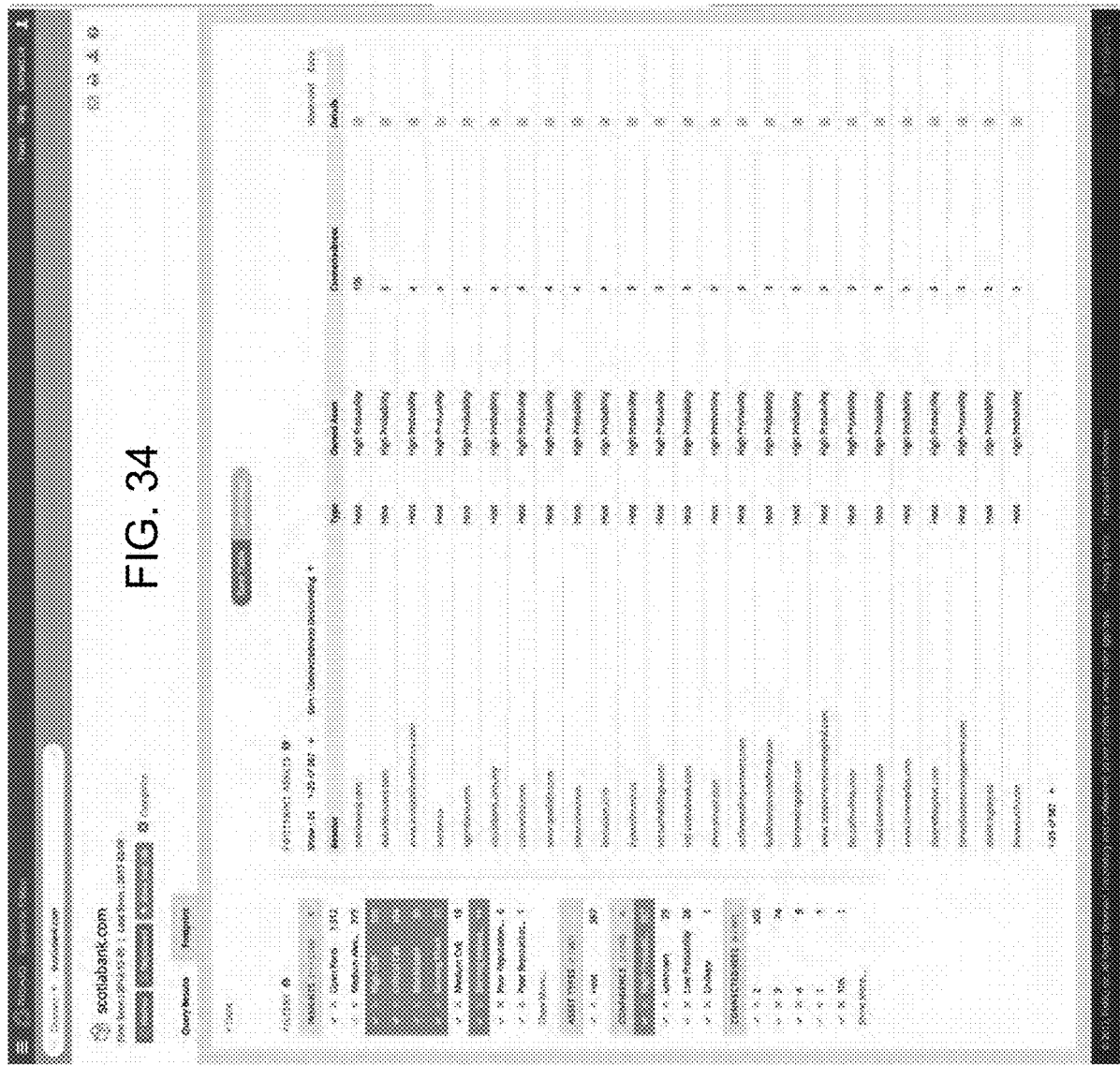

FIG. 34 illustrates an example of selective filtering for the graph. In a table view, a user may interact with the "filters" to select values for one or more attributes, each corresponding to a different category of information for a record, such as "insights," "asset types," "confidence," and "connectedness." In some embodiments, insights for filtering may be based on attributes about connections and/or malicious activity for an asset. For example, insights may include open ports, Alexa rank, CVE, blacklisting, phishing, malware, reputation, or other types of attributes related to insights about network analysis of related assets. The insights may be specific to the asset for the record being shown. Such information may be pulled from third party sources and/or analysis of Internet data.

Figure 35:
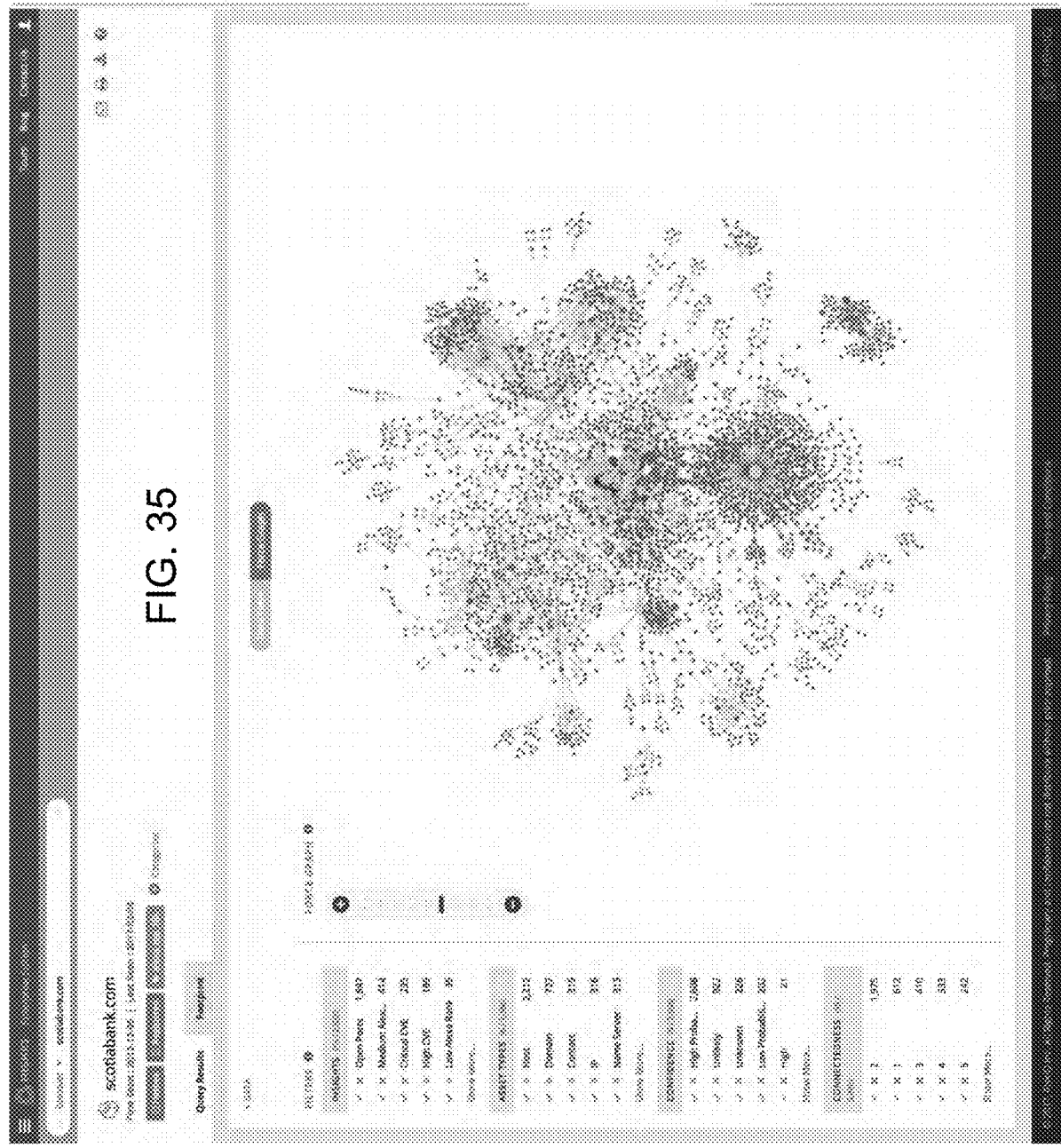

On the example shown in FIG. 34, assets having a high probability of confidence relationship to "Scotiabank.com" are selected. Assets are further filtered by insights, such as high CVE, critical CVE, blacklisted, serving phishing, and serving malware. The filtering enables a user to identify those assets which are related to a domain and have a high likelihood of malicious activity. FIG. 35 shows an example of a graph view of the assets related to a domain "Scotiabank.com." Now turning to FIG. 36, interaction with a node for the domain "Scotiabank.com" cause a graphical interface to be displayed with information about assets related to the node for the domain. Interaction with the node may cause the graph view to adjust or be regenerated to show those nodes corresponding to assets or data about assets related to or concerning the domain. For example, the graph view may show connections to different nodes, each corresponding to assets, such as contacts, name servers, and hosts. Each connection and node corresponding to a connection may have a visual appearance that is particular to the type of asset, and/or connection. For example, the nodes and connections for each of the different types of nodes, contacts, name servers, and hosts may be displayed with a different visual appearance. The graphical interface displaying information about the node for the domain may display information and statistics about each asset or data corresponding to a node connected to the node for the domain. The graphical interface may display a number of connections, and information about each linked asset (e.g., asset related by a connection) in a category corresponding to the type of asset. Each asset may be interactive to display information about the asset and/or pivot in the graph view to a node corresponding to that asset. By scrolling through the graphical interface, a user can identify unrecognized contacts, hosts, and/or name servers, any of which can be used to pivot analysis to a different node corresponding to a possibly malicious asset.

Figure 36:
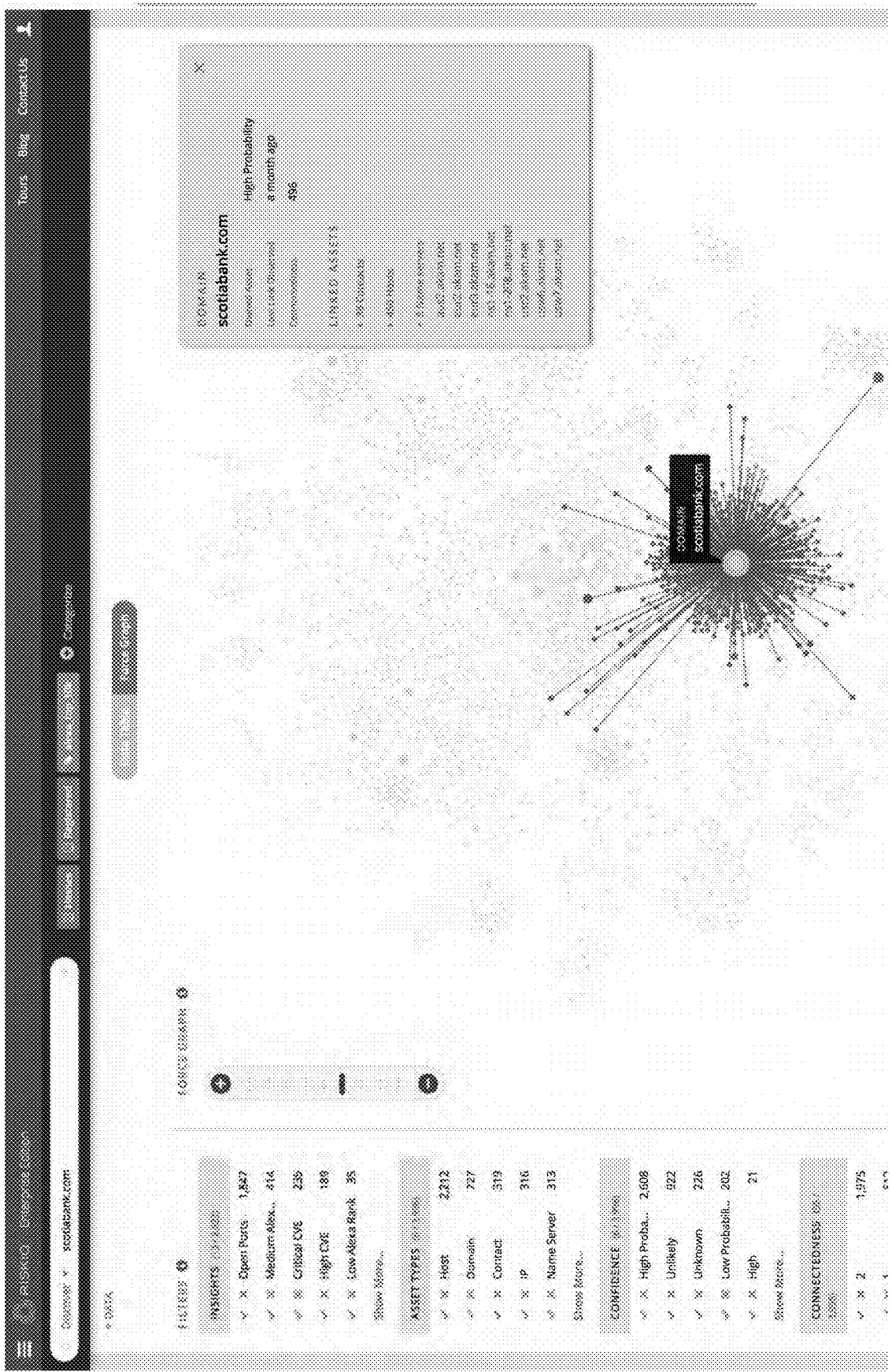
Figure 37:
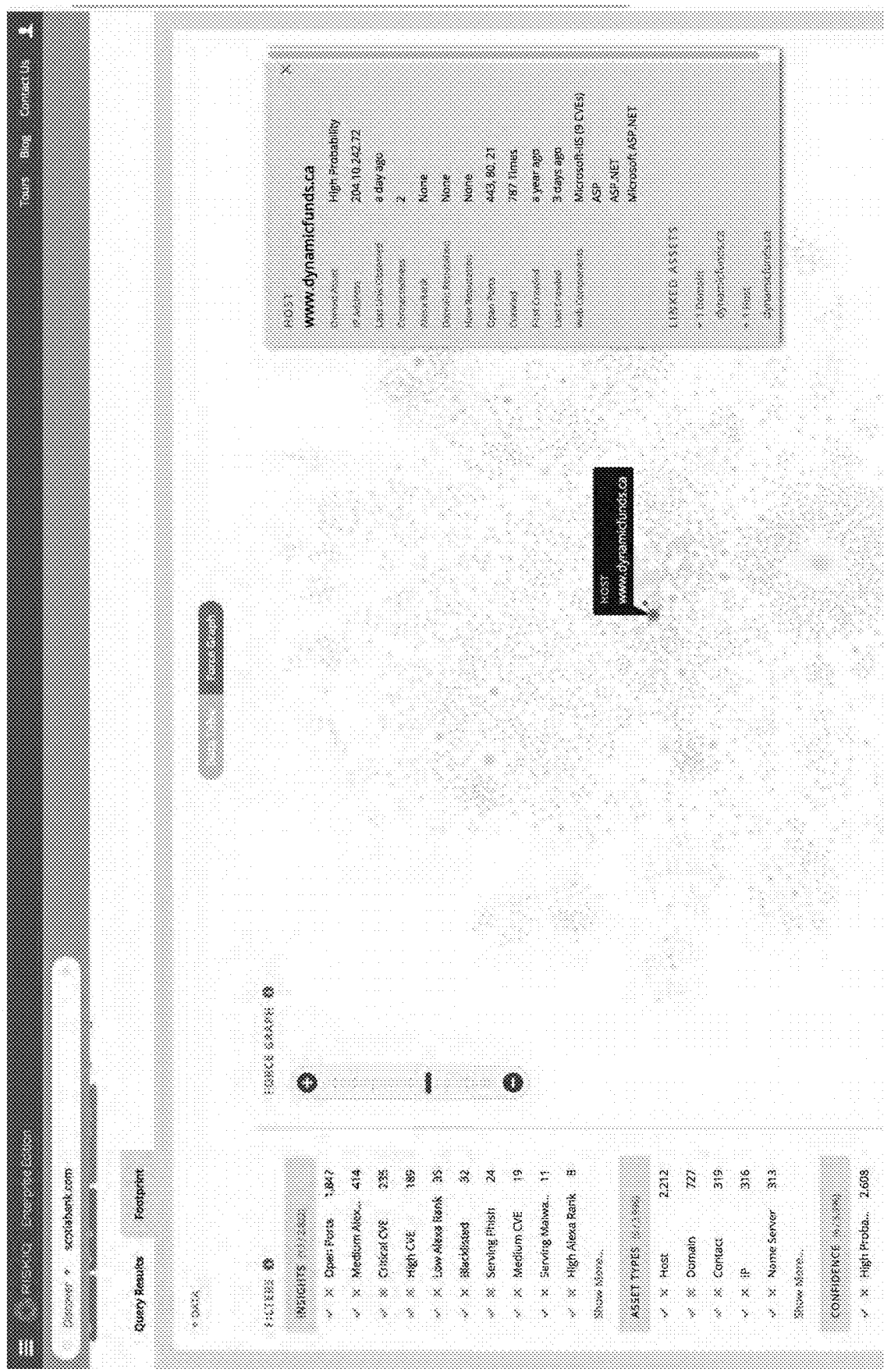

FIG. 37 illustrates a graphical interface of a graph view of assets based on interaction with the graph in FIG. 36. For example, a user may pivot on a node corresponding to an unknown host "www.dynamicfunds.ca" identified as related to the domain "Scotiabank.com." Interaction with the node in the graph of FIG. 36 or interaction with the host listed in the graphical interface of information of related assets may cause the graph view to shift to the node corresponding to the host "www.dynamicfunds.ca." Interaction with the node for the host may cause a graphical interface to be displayed with information including activity about the host and when the host was established. The information may be useful to enable an analyst to assess the relationship and/or activity of the host with respect to the domain "Scotiabank.com." The graphical interface may display linked assets to the host, which may be further used to assess the host and its relationship to the domain.

Figure 38:
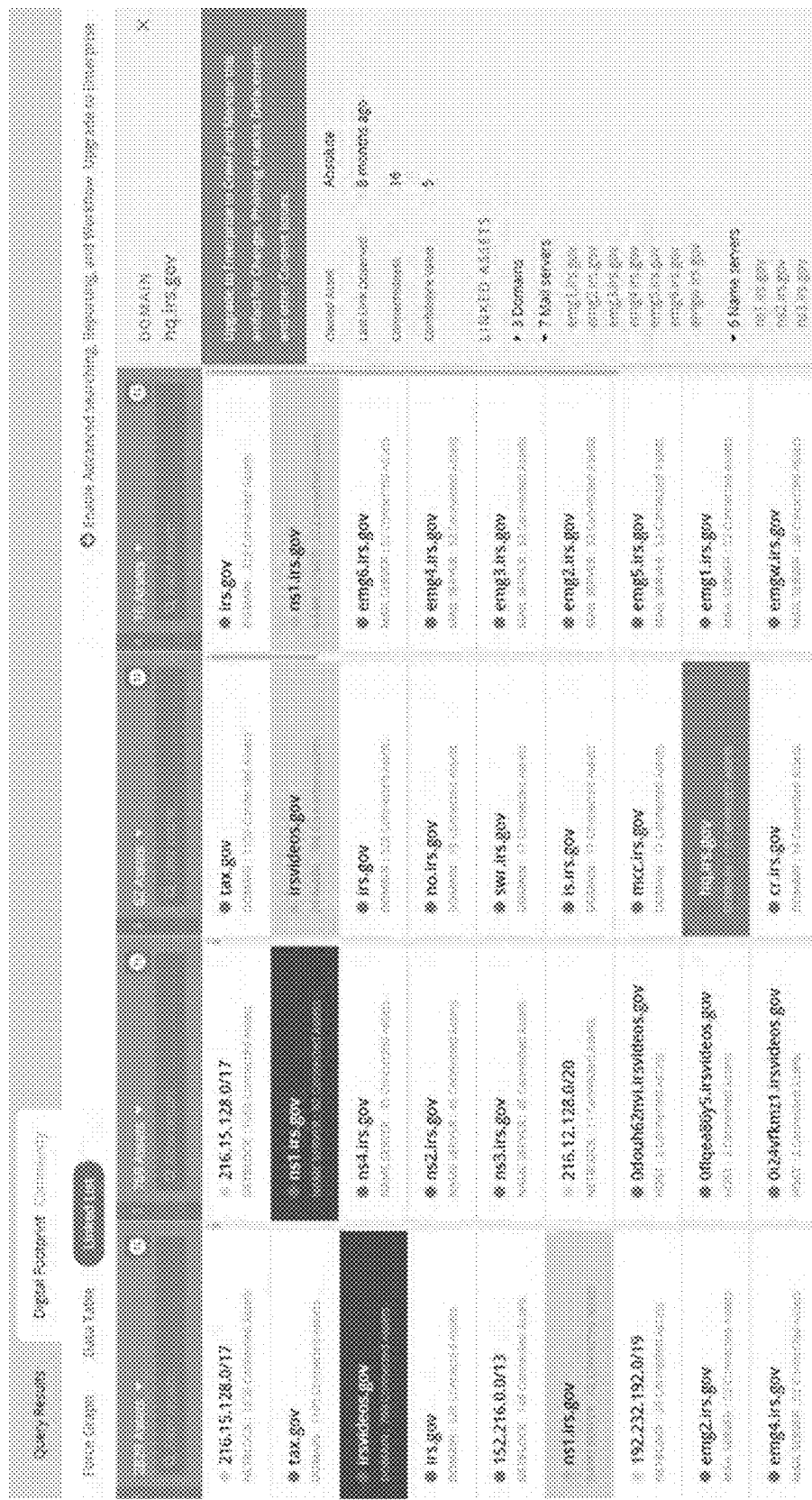

FIG. 38 illustrates a graphical interface of a linked list view of assets based on a digital footprint of irs.gov. As described above, a linked list view of assets enables a user to select from a first column of assets that populates a second column of assets based on the selected asset from the first column. Here, irsvideos.gov is the selected asset in the first column, which populates a listing of 769 assets connected or adjacent to the selected asset. The selected asset in the second column is ns1.irs.gov, a name server with 62 connected assets, as illustrated and populated in the third column of the linked list view of assets. The selected asset in the third column is hq.irs.gov which has 16 connected assets, populated in the fourth column. In each of the columns, the previously selected columns have been grayed out, or faded, because such selection would be a circular connection. Selecting the force graph view in the graphical interface would direct the user to a graphical representation of the last selected node in the linked list view.

In an embodiment, an apparatus comprises a processor and is configured to perform any of the foregoing methods. In an embodiment, one or more non-transitory computer-readable storage media, storing software instructions, which when executed by one or more processors cause performance of any of the foregoing methods. Note that, although separate embodiments are discussed herein, any combination of embodiments and/or partial embodiments discussed herein may be combined to form further embodiments.

4.0 IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
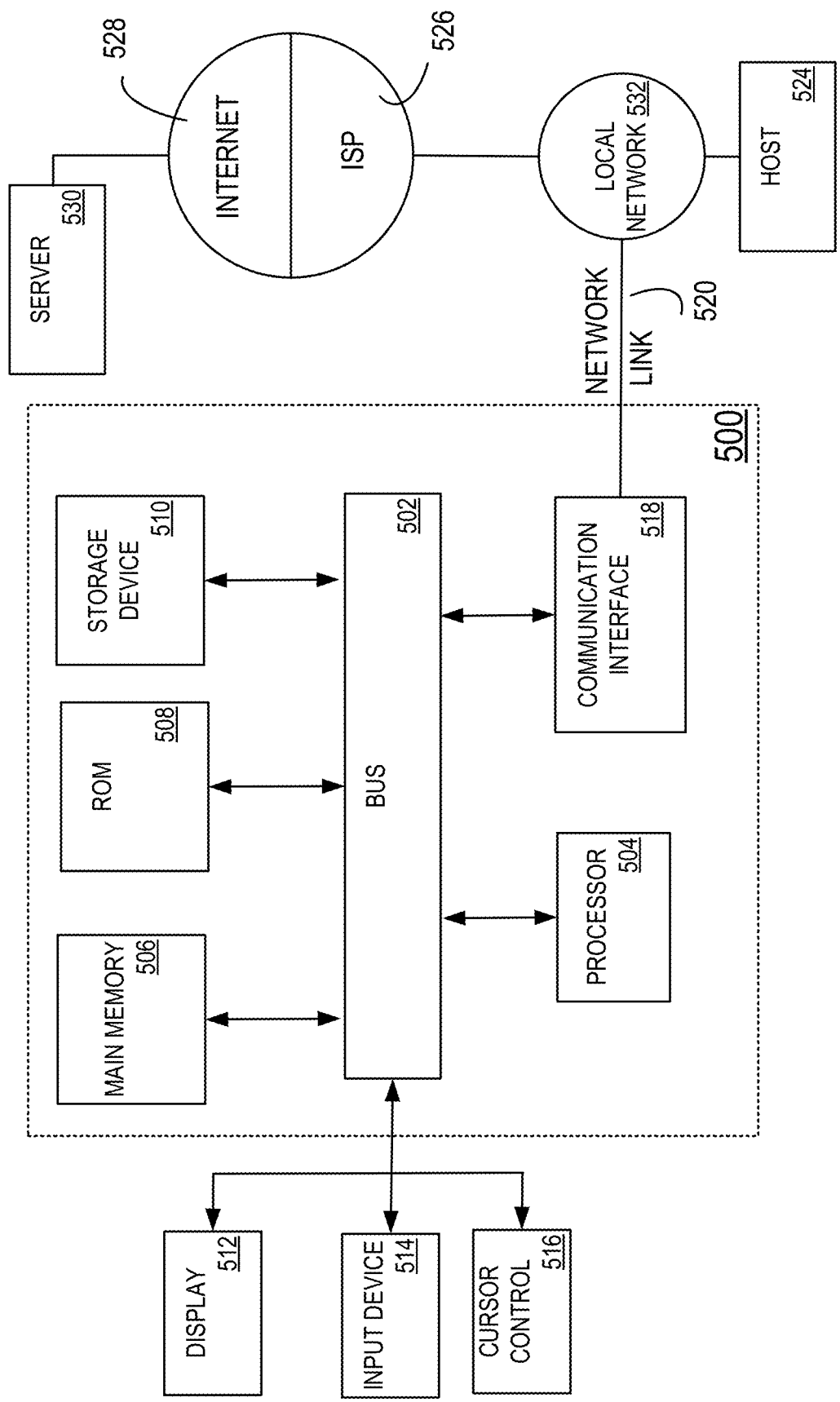
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, or any other memory chip or cartridge.

Storage media is distinct from, but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicant to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
receiving entity information associated with a digital footprint request;
retrieving network data associated with the entity information from a network data store based on the entity information;
determining an inventory of Internet-facing assets associated with the entity information;
calculating a confidence score for each asset in the inventory of Internet-facing assets associated with the entity information, the confidence score indicating a confidence level that the asset is owned, managed, or controlled by the entity, the confidence score using information from a measure of connections between the asset and other assets in the inventory;
generating a visual representation of the inventory of Internet-facing assets as a digital footprint of the entity information for presentation within a graphical user interface, the visual representation including a representation of the confidence score for each asset in the inventory of Internet-facing assets.

2. The method as recited in claim 1, wherein the entity information comprises at least of a domain name, a domain registrant email account, a name server, a Host, an autonomous system number (ASN), an internet protocol (IP) block, an IP Address, or a mail server.

3. The method as recited in claim 1, wherein network data is gathered from at least one of DNS data sources, domain registration data sources, SSL data sources, or border gateway protocol data sources.

4. The method as recited in claim 1, wherein retrievable security attributes are associated with one or more said network data in the inventory, the retrievable security attributes including at least one of malware, open ports, blacklists, or CVEs data sources.

5. The method as recited in claim 1, wherein network data includes relationship data describing relationships between the Internet-facing assets.

6. The method as recited in claim 5, further comprising generating the confidence score for each Internet-facing asset based on a rule engine using the relationship data.

7. The method as recited in claim 1, wherein the visual representation of the inventory of Internet-facing assets comprises a force graph view.

8. The method as recited in claim 1, wherein the visual representation of the inventory of Internet-facing assets comprises a linked list view.

9. The method as recited in claim 1, wherein, responsive to receiving a user interaction with the graphical user interface to display social media presence information, each Internet-facing asset of the digital footprint is updated to include the social media presence information.

10. The method as recited in claim 1, wherein mobile application information is associated with the entity and the visual representation of the inventory is updated to include the mobile application information.

11. One or more non-transitory computer-readable storage media, storing one or more sequences of instructions, which when executed by one or more processors coupled to memory cause performance of:
receiving entity information associated with a digital footprint request;
retrieving network data associated with the entity information from a network data store based on the entity information;
determining an inventory of Internet-facing assets associated with the entity information;
calculating a confidence score for each asset in the inventory of Internet-facing assets associated with the entity information, the confidence score indicating a confidence level that the asset is owned, managed, or controlled by the entity, the confidence score using information from a measure of connections between the asset and other assets in the inventory;
generating a visual representation of the inventory of Internet-facing assets as a digital footprint of the entity information for presentation within a graphical user interface, the visual representation including a representation of the confidence score for each asset in the inventory of Internet-facing assets.

12. The one or more non-transitory computer-readable storage media of claim 11, wherein the entity information comprises at least of a domain name, a domain registrant email account, a name server, a Host, an autonomous system number (ASN), an internet protocol (IP) block, an IP Address, or a mail server.

13. The one or more non-transitory computer-readable storage media of claim 11, wherein network data is gathered from at least one of DNS data sources, domain registration data sources, SSL data sources, or border gateway protocol data sources.

14. The one or more non-transitory computer-readable storage media of claim 11, wherein retrievable security attributes are associated with one or more the network data in the inventory, the retrievable security attributes including at least one of malware, open ports, blacklists, or CVEs data sources.

15. The one or more non-transitory computer-readable storage media of claim 11, wherein network data includes relationship data describing relationships between the Internet-facing assets.

16. The one or more non-transitory computer-readable storage media of claim 15, which when executed by the one or more processors cause further performance of: generating a confidence score for each Internet-facing asset based on a rule engine using the relationship data.

17. The one or more non-transitory computer-readable storage media of claim 11, wherein the visual representation of the inventory of Internet-facing assets comprises a force graph view.

18. The one or more non-transitory computer-readable storage media of claim 11, wherein the visual representation of the inventory of Internet-facing assets comprises a linked list view.

19. The one or more non-transitory computer-readable storage media of claim 11, wherein the visual representation of the inventory of Internet-facing assets includes an audit trail.

20. The one or more non-transitory computer-readable storage media of claim 11, wherein, responsive to receiving a user interaction with the graphical user interface to display social media presence information, each Internet-facing asset of the digital footprint is updated to include the social media presence information.

21. The one or more non-transitory computer-readable storage media of claim 11, wherein mobile application information is associated with the entity and the visual representation of the inventory is updated to include the mobile application information.

22. A system, comprising:
one or more computing processors coupled to one or more non-transitory computer readable media storing a program of instructions that is executable by the one or more computing processors to perform:
receiving entity information associated with a digital footprint request;
retrieving network data associated with the entity information from a network data store based on the entity information;
determining an inventory of Internet-facing assets associated with the entity information;
calculating a confidence score for each asset in the inventory of Internet-facing assets associated with the entity information, the confidence score indicating a confidence level that the asset is owned, managed, or controlled by the entity, the confidence score using information from a measure of connections between the asset and other assets in the inventory;
generating a visual representation of the inventory of Internet-facing assets as a digital footprint of the entity information for presentation within a graphical user interface, the visual representation including a representation of the confidence score for each asset in the inventory of Internet-facing assets.

23. The system as recited in claim 22, wherein the entity information comprises at least of a domain name, a domain registrant email account, a name server, a Host, an autonomous system number (ASN), an internet protocol (IP) block, an IP Address, or a mail server.

24. The system as recited in claim 22, wherein network data is gathered from at least one of DNS data sources, domain registration data sources, SSL data sources, or border gateway protocol data sources.

25. The system as recited in claim 22, wherein retrievable security attributes are associated with one or more the network data in the inventory, the retrievable security attributes including at least one of malware, open ports, blacklists, or CVEs data sources.

26. The system as recited in claim 22, wherein network data includes relationship data describing relationships between the Internet-facing assets.

27. The system as recited in claim 26, further comprising generating a confidence score for each Internet-facing asset based on a rule engine using the relationship data.

28. The system as recited in claim 22, wherein the visual representation of the inventory of Internet-facing assets comprises a force graph view.

29. The system as recited in claim 22, wherein the visual representation of the inventory of Internet-facing assets comprises a linked list view.

30. The system of claim 22, wherein, responsive to receiving a user interaction with the graphical user interface to display social media presence information, each Internet-facing asset of the digital footprint is updated to include the social media presence information.

31. The system of claim 22, wherein mobile application information is associated with the entity and the visual representation of the inventory is updated to include the mobile application information.

* * * * *